(12) United States Patent
Fein et al.

(10) Patent No.: US 9,503,592 B2
(45) Date of Patent: Nov. 22, 2016

(54) RETRIEVING DATA ASSOCIATED WITH A PRINTER USING NEAR FIELD COMMUNICATION

(71) Applicant: ZIH Corp., Lincolnshire, IL (US)

(72) Inventors: Michael Fein, Ann Arbor, MI (US); Dean H. Lodwig, West Hills, CA (US); Joseph Sargon Sayad, Calabasas, CA (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 14/744,002

(22) Filed: Jun. 18, 2015

(65) Prior Publication Data
US 2015/0288835 A1    Oct. 8, 2015

Related U.S. Application Data

(63) Continuation of application No. 13/773,321, filed on Feb. 21, 2013, now abandoned.

(60) Provisional application No. 61/601,496, filed on Feb. 21, 2012, provisional application No. 61/712,684, filed on Oct. 11, 2012.

(51) Int. Cl.
*H04N 1/00* (2006.01)
*H04W 4/00* (2009.01)
(Continued)

(52) U.S. Cl.
CPC ........ *H04N 1/00342* (2013.01); *G06F 3/1204* (2013.01); *G06F 3/1209* (2013.01);
(Continued)

(58) Field of Classification Search
CPC .. H04B 5/0025; H04W 4/008; G06F 3/1285; H04N 1/00339; H04N 1/00342; H04N 2201/006

USPC .............................. 358/1.15; 455/41.1, 41.2
See application file for complete search history.

(56) References Cited

U.S. PATENT DOCUMENTS

| 5,189,658 | A | 2/1993 | Moses |
| 5,220,674 | A | 6/1993 | Morgan et al. |

(Continued)

FOREIGN PATENT DOCUMENTS

| EP | 2 026 256 A1 | 2/2009 |
| EP | 2 026 615 A2 | 2/2009 |

(Continued)

OTHER PUBLICATIONS

International Search Report and Written Opinion for Application No. PCT/US2013/027164 dated Jun. 17, 2013.
(Continued)

*Primary Examiner* — Eric A Rust

(57) ABSTRACT

Aspects of the disclosure provide systems, methods, and apparatuses for leveraging near field communications (NFC) in conjunction with printer devices. Examples of the disclosure provide for novel methods of interfacing with printers configured to use near field communications using NFC enabled readers and output media. Examples include using a smart phone to access data stored on an NFC tag associated with the printer. The data provided by the NFC tag may include printer status information, printer configuration information, network information, or other data relating to operation and maintenance of the printer. The printer may also encode the NFC tag dynamically, including encoding data to NFC tags included on print media. The printer may encode an NFC tag associated with media with a variety of information in support of various use cases.

21 Claims, 11 Drawing Sheets

(51) Int. Cl.
*H04B 5/00* (2006.01)
*G06F 3/12* (2006.01)
*H04W 84/10* (2009.01)
*H04W 92/18* (2009.01)

(52) U.S. Cl.
CPC ............ *G06F3/1236* (2013.01); *G06F 3/1285* (2013.01); *G06F 3/1292* (2013.01); *H04B 5/0025* (2013.01); *H04W 4/008* (2013.01); *H04B 5/0037* (2013.01); *H04N 2201/006* (2013.01); *H04N 2201/0082* (2013.01); *H04W 84/10* (2013.01); *H04W 92/18* (2013.01)

(56) References Cited

U.S. PATENT DOCUMENTS

| | | | |
|---|---|---|---|
| 5,524,993 | A | 6/1996 | Durst |
| 5,767,498 | A | 6/1998 | Heske et al. |
| 5,845,057 | A | 12/1998 | Takeda et al. |
| 6,379,058 | B1 | 4/2002 | Petteruti et al. |
| 6,398,113 | B1 | 6/2002 | Heske, III |
| 6,718,490 | B1 | 4/2004 | Takemoto |
| 7,126,716 | B1 | 10/2006 | Kaufman et al. |
| 8,382,481 | B2 | 2/2013 | Becker |
| 8,799,609 | B1 | 8/2014 | Bauer |
| 8,870,478 | B2 | 10/2014 | Tsirline et al. |
| 2003/0043243 | A1 | 3/2003 | Trafton et al. |
| 2004/0212655 | A1 | 10/2004 | Sasa |
| 2005/0006468 | A1 | 1/2005 | Fandel et al. |
| 2006/0029399 | A1 | 2/2006 | Park et al. |
| 2007/0201081 | A1 | 8/2007 | Murayama |
| 2007/0211099 | A1 | 9/2007 | Lyons et al. |
| 2008/0106762 | A1 | 5/2008 | Mullender et al. |
| 2008/0151058 | A1 | 6/2008 | Xu et al. |
| 2008/0278753 | A1 | 11/2008 | Oda et al. |
| 2008/0298822 | A1 | 12/2008 | Tsirline et al. |
| 2009/0016743 | A1 | 1/2009 | Tye et al. |
| 2009/0237741 | A1 | 9/2009 | Kurahashi |
| 2010/0290071 | A1 | 11/2010 | Okada et al. |
| 2011/0158659 | A1 | 6/2011 | Tarao |
| 2011/0295502 | A1 | 12/2011 | Faenger |
| 2012/0099566 | A1* | 4/2012 | Laine .................. H04M 1/7253 370/338 |
| 2012/0194854 | A1 | 8/2012 | Tang et al. |
| 2012/0208461 | A1 | 8/2012 | Choi et al. |
| 2012/0214414 | A1 | 8/2012 | Abel et al. |
| 2013/0169996 | A1 | 7/2013 | McLeod et al. |
| 2015/0146222 | A1 | 5/2015 | Hunt et al. |

FOREIGN PATENT DOCUMENTS

| | | |
|---|---|---|
| JP | 2007041840 | 2/2007 |
| WO | WO 2010/107125 A1 | 9/2010 |
| WO | 2012/071174 A1 | 5/2012 |

OTHER PUBLICATIONS

Sony Global—FeliCa—NFC Dynamic tage (FeliCa Plug)—RC-S801 / S802 / S926 [online] [retrieved Jun. 24, 2013]. Retrieved from the Internet: <URL: http://www.sony.net/Products/Felica/business/products/RC-S801_802.html.>. (undated) 3 pages.

English language machine translation of EP 2 026 256 A1 to Ponert et al., Published Feb. 18, 2009.

What NFC, and Why Should You Care?, by Sascha Segan [online] [retrieved Feb. 20, 2012]. Retrieved from the Internet: <URL: http://www.pcmag.com/article2/0,2817,2372849,00.asp>. (dated Nov. 17, 2010) 8 pages.

Near Field Communication—Wikipedia, the free encyclopedia [online] [retrieved Feb. 20, 2012]. Retrieved from the Internet: <URL: http://en.wikipedia.org/wiki/Near_field_communication>. (dated Feb. 20, 2012) 27 pages.

Near Field Communications: a technology primer [online] [retrieved Feb. 20, 2012]. Retrieved from the Internet: <URL: http://arstechnica.com/gadgets/guides/2011/02/near-field-communications-a-technology-pr . . .> (dated "published about a year ago" (approximately Feb. 2011) 2 pages.

* cited by examiner

RETRIEVING DATA ASSOCIATED WITH A PRINTER USING NEAR FIELD COMMUNICATION

CROSS-REFERENCE TO RELATED APPLICATIONS

This non-provisional application is a continuation of U.S. application Ser. No. 13/773,321, filed Feb. 21, 2013, which claims the benefit of U.S. Provisional Patent Application No. 61/601,496, filed Feb. 21, 2012, and U.S. Provisional Patent 61/712,684, filed Oct. 11, 2012, the entire contents of which are hereby incorporated by reference.

TECHNICAL FIELD

Embodiments of the present invention relate generally to the field of communications technology, and more particularly, example embodiments relate to implementing near field communications (NFC) with a printer.

TECHNICAL BACKGROUND

As technology advances, it is more and more common for electronic devices to have the ability to communicate with one another to streamline common tasks. Various wired and wireless protocols have been developed to allow machines to communicate with one another, such as 802.11, Bluetooth, Zigbee, and others. These protocols allow common devices to transmit data directly to and from one-another, allowing for efficient and fast interaction without the need for direct user intervention.

One device that may benefit from such communications is the printer. At its most basic, the printer allows for representation of electronic information in a physical medium. Current implementations of wireless networks allow for communication with printers without the need for cables. However, the limitations of 802.11 and other such protocols become apparent when considering scenarios with multiple devices in proximity with one another, or where physical proximity is desirable. If the user does not know the network address of the printer with which the user intends to interact, it may not be immediately apparent how to access the printer on the network. The range and sophistication of these protocols may also present drawbacks in many other use cases, including when performing maintenance operations and when detecting a particular printer's configuration. Finally, during initial setup and configuration, printers may not be able to access a local network, making the use of prior art network protocols impractical.

SUMMARY

Near-field communication describes a communication technology whereby two devices can communicate when they are in close proximity to each other, without being physically connected. Typically this involves one device, often called a reader, which generates an electromagnetic radio field. The second device, often called a tag, may include a coiled antenna. The electromagnetic field created by the reader causes an electrical signal to be inducted in the tag. That signal may be used to power a chip in the tag, which may recall stored information or carry out simple processes. Information or instructions from the tag may then be encoded into the magnetic field where it can be read by the reader. The tag may also have its own power source, allowing it to manipulate the electromagnetic field independently of the reader. Tags without power are often called passive tags. Some passive tags are embedded in plastic cards or paper labels so they may be easily printed. Tags with power are often called active tags, peer-to-peer tags, or NFC Emulator. A single device may be able to function as a peer-to-peer device when power is available, but function as a passive tag when power is turned off or otherwise unavailable. Manufacturers of radio devices, including mobile phones, have begun selling components which combine peer-to-peer communication capability with other desirable features, such as radios, screens, and user-input capabilities. For a certain power level the strength of the electromagnetic field drops quickly as the distance between the tag and reader increases, so communication is best achieved at acceptable power levels only when the devices are near to each other, or "tapped," hence the name, Near Field Communication (NFC).

Example embodiments of the invention describe methods, systems, apparatuses, and computer program products using near field communications in conjunction with a printer. Embodiments may include methods and apparatuses for executing operations in response to receiving data via near field communications. One embodiment may involve placing a tag on the printer so it may be tapped with a reader. An example method may include generating a near field communication (NFC) field using an NFC enabled device, receiving, from an NFC tag associated with a printer, a set of data associated with the printer in response to the generated NFC field, and executing at least one operation via the NFC enabled device in response to receiving the set of data. The set of data may include information specific to the printer, such as information for establishing a network connection or wireless link with the printer, a printer serial number or model number, printer warranty information, printer state information, printer error codes, network addresses associated with content related to the printer, or the like. In some embodiments, the NFC enabled device establishes a remote interface to the printer using the set of data. In some embodiments, the set of data includes instructions for executing a plurality of operations on the NFC enabled device, and the method includes receiving an indication of a selection of at least one of the plurality of operations. The NFC enabled device may execute the selected operation in response to receiving the indication of the selection. In some embodiments, the set of data may be used to initiate a printer maintenance request, such as by transmitting printer diagnostic information to the NFC enabled device, and transmitting the printer diagnostic information to a remote computer using the NFC enabled device. In yet further example embodiments, the set of data may provide instructions to the NFC enabled device to download and/or install an application for maintaining or otherwise interacting with the printer. The set of data may also provide instructions for execution of the application by the NFC enabled device.

Embodiments may also provide methods and apparatuses for modifying data provided by an active NFC tag, or NFC emulator. An example method may include receiving a first set of information, programming a near field communications tag emulator with the first set of information via communications circuitry coupling a printer to the NFC tag emulator; and in response to a NFC field, providing the first set of information to a NFC enabled device using the NFC emulator. The first set of information may be associated with the printer. In some embodiments, the NFC emulator may be further encoded with a second set of information. The second set of information may be associated with the printer and different from the first set of information. The NFC tag emulator may be programmed with the second set of information via the communications circuitry, in response to the NFC field, the NFC emulator may provide the second set of information to the NFC enabled device using the NFC emulator. The NFC emulator may further include a printer maintenance operation, a printer diagnostic operation, a printer media ordering operation, or a printer warranty status operation.

Embodiments may also include methods and apparatuses for providing printer data via an NFC tag. An example apparatus for providing printer data via an NFC tag may include a printer, and a NFC tag configured to, in response to a NFC field, provide a NFC enabled device with information associated with the printer. The information may include a printer model number, a printer serial number, media compatible with the printer, parts compatible with the printer, or a uniform resource locator associated with the printer. The NFC tag may be configured to provide instructions that cause the NFC enabled device to execute an application associated with the printer. The information may be encoded in one or more NFC data exchange format records. The information may also include network information for initiating network communication with the printer via a wireless network or device information for initiating communication with the printer in a non-network environment. In some embodiments, the information may include instructions that cause an NFC enabled device to initiate a remote management interface with the printer.

Embodiments may also include methods and apparatuses for providing data via an NFC emulator. An example apparatus may include a near field communications (NFC) emulator configured to output information via NFC in response to receiving an NFC field and at least one processor disposed in electronic communication with an NFC emulator. The at least one processor may be configured to detect a first apparatus condition, and determine a first set of information representative of the first apparatus condition. The NFC emulator may provide the first set of information to an NFC enabled device via a NFC field, in response to determination of the first set of information or in response to a request from the NFC enabled device. The processor may also detect a second apparatus condition indication, determine a second set of information representative of the second apparatus condition indication, wherein the second set of information is different from the first set of information, via the control circuitry and in response to determining the second set of information, program the NFC emulator to provide the second set of information to an NFC enabled device via the NFC field, and output the second set of information via NFC using the NFC emulator. In some embodiments, the first or second set of information are apparatus status information, such as error codes or printer settings. In some embodiments, the apparatus is configured to receive external information from an NFC enabled device via a NFC protocol, and the processor is further configured to receive the external information from the NFC emulator. In some embodiments, the apparatus is a printer, and the at least one processor is configured to control a print head to perform a media printing operation, and wherein the second apparatus condition indication is related to the media printing operation.

BRIEF DESCRIPTION OF THE DRAWINGS

Reference will now be made to the accompanying drawings, which are not necessarily drawn to scale, and wherein.

DETAILED DESCRIPTION

Figure 1:
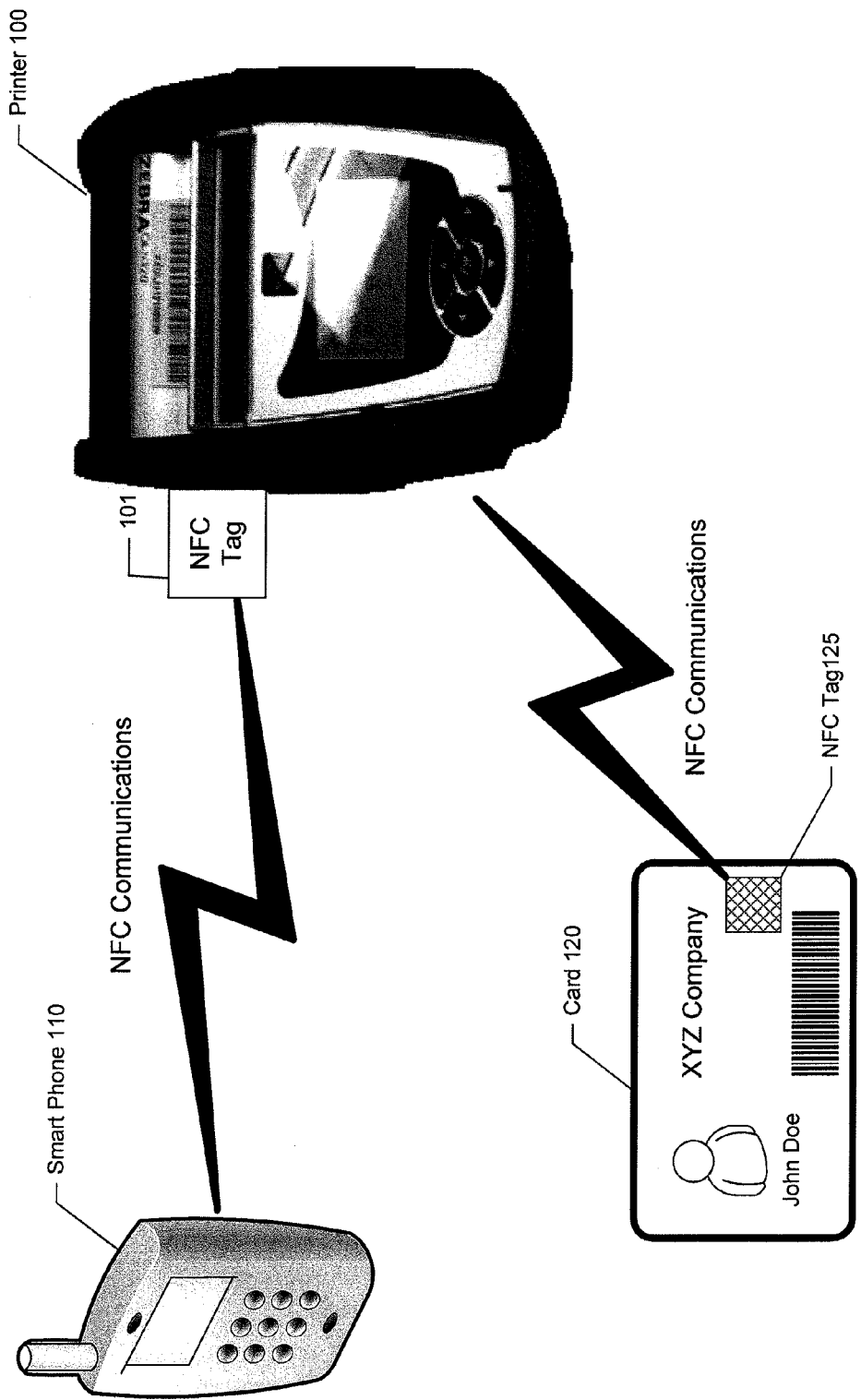
FIG. 1 illustrates an example system for implementing near field communications with a printer according to various example embodiments.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

The following provides a description of various example apparatuses and methods that leverage the use of near field communications (NFC) with a printer to implement various functionalities. As illustrated in FIG. 1, a printer 100 may be configured to enable near field communication with a variety of NFC enabled devices including smart phones (e.g., a smart phone 110), tablet devices, and NFC tags (e.g., NFC tag 125 embedded in card 120). In some example embodiments, the printer 100 may be configured to communicate with the NFC tag of the card 120 to encode the tag with data, possibly in association with an operation to print an image on the card 120. In some example embodiments, the printer 100 may include an NFC tag 101. The NFC tag 101 may include information to be transmitted to other NFC enabled devices. The functionality performed by the printer 100 may be implemented via execution of a local printer application or some of the functionality may be performed via processing that occurred at a host processor or a server connected via a network or a cloud device.

Near field communications are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. Typical ranges for near field communications are approximately four centimeters. Near field communications can support two-way (or peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications.

Because near field communications require close proximity (e.g., no more than a few inches) to establish a communications link, the operation of establishing a link with another NFC device may be referred to as a "tap." The term "tap" as used herein does not necessarily refer to physical contact between communicating NFC devices, but rather positioning the NFC devices in sufficiently close proximity to establish an NFC communications link. Therefore, a user of an NFC enabled smart phone may tap an NFC tag to retrieve data from the tag. Similarly, two NFC enabled smart phones may be tapped together to share contact information or the like between the devices.

Near field communications offers several advantages over other wireless protocols and methods for encoding data to be read by a mobile terminal. The short range nature of near field communications ensures that the user of the mobile terminal reading the NFC tag is in close proximity to the NFC tag. This allows the user of the mobile terminal to ensure they are communicating with the correct NFC tag, avoiding cross-talk from other nearby tags. The short range of NFC also provides benefits for managing access and security. Owners of devices coupled to NFC tags may ensure that only authorized users are allowed to access the NFC tag by limiting physical proximity to the tag to said authorized users. The short range also allows the owner of the tag to infer the intent of the user of the mobile device, as unlikely tag interactions are much less likely than with longer range protocols. The wireless nature of near field communications also provides benefits over other methods of encoding data. For example, bar codes and quick response (QR) codes require the mobile terminal reading the tag to have a visual read of the tag. Furthermore, such visual methods of providing data require the user of the mobile terminal to enable an image capture mode, and to line up the QR code or barcode with an image reader coupled to the mobile terminal.

NFC tags may also be configured to initiate transactions. Because of the low power nature of near field communications, mobile terminals that are enabled for near field communications may enable a NFC radio passively during operation of the mobile terminal, without the user having to explicitly initiate a transaction. This allows the mobile terminal to continuously poll for new NFC tag information, and to process said information upon receipt. NFC tags may thus be configured with records that, when read by the mobile terminal, cause the mobile terminal to perform certain processing actions, such as launching of applications, navigating to a particular website, or downloading of a particular file. These records may be encoded according to a NFC Data Exchange Format (NDEF) protocol. NDEF records may include a type field and a data payload field, each of which instructs the reading mobile terminal how to process the record.

The data rate for near field communications is low relative to other protocols such as Bluetooth or WiFi. Although other data rates may be used, common rates for data transfer using near field communications are 106, 212, and 424 kbits/s. However, near field communications may be leveraged in many situations to complement the use of other protocols that support higher speeds for operations such as pairing devices. Near field communications also offer an option for wireless communications at a relatively low power.

To support near field communications, a communications device (e.g., printer 100, smart phone 110, or NFC tag 125) may include an antenna. The antenna may, according to some example embodiments, be a coupler that generates a magnetic induction field for transmitting data to another device. In some example embodiments, a device may include a loop antenna that magnetically couples to a loop antenna of another NFC device to support communications between the devices. The printer 100 may include a specially encoded NFC tag. The NFC tag may be simply affixed to the printer 100 as a static tag or the tag may be integrated into the communications interface of the printer 100 as a dynamic tag that is powered by the printer 100.

In some embodiments, the NFC tag may be operable to initiate a network connection between an NFC enabled device (e.g., the smart phone 110) and the printer 100 via a network protocol other than NFC. For example, the specially encoded NFC tag of the printer 100 may respond to a field generated by another NFC enabled device by providing information that identifies network information about the printer 100 (e.g., Bluetooth address, IP address, MAC address, or the like). In this regard, the printer's NFC tag may transmit a printer identifier for receipt by, for example, the smart phone 110. The smart phone 110 may be configured to identify the printer identifier as being associated with a printer device and to launch an application that may begin the process of pairing the smart phone 110 with the printer 100.

The pairing process may involve establishing a different communications link, such as a Bluetooth or WiFi link between the smart phone 110 and the printer 100. Upon establishing a higher speed link, the printer 100 may be configured to send/receive data to/from the smart phone 110 to perform various tasks via the higher speed link. For example, the smart phone 110 may be configured to initiate a print job with the printer 100 to print, for example, labels or the like.

Figure 2:
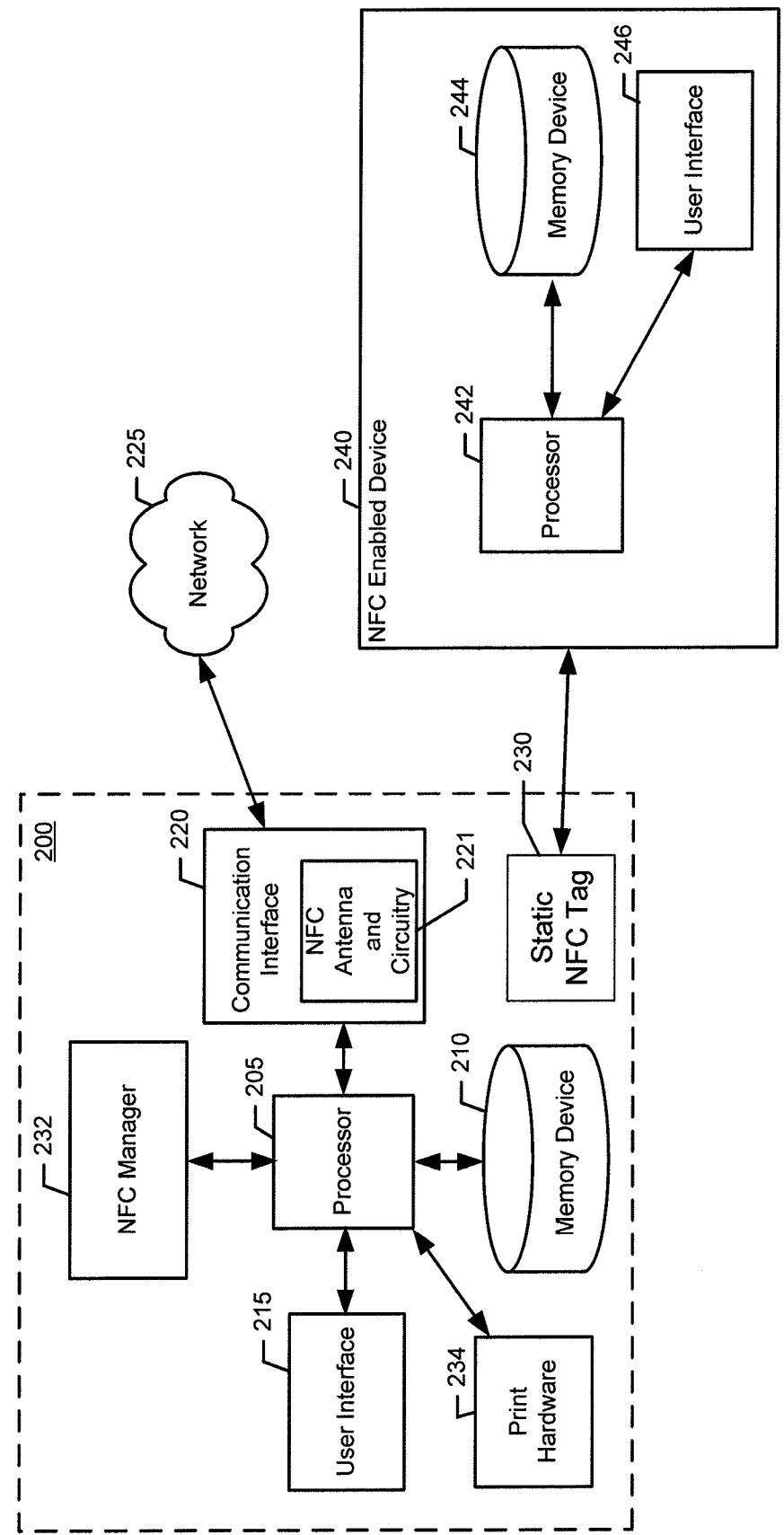
FIG. 2 is a block diagram of an example printing apparatus using a static NFC tag according to various example embodiments.

FIG. 2 depicts a block diagram of an example apparatus 200 including a static NFC tag 230, where an NFC enabled device 240 is in communication with the static NFC tag 230. The static NFC tag 230 may be implemented as a chip, a label, a sticker, or any passive or active device that is operable to respond to an NFC field with a particular set of data. In the present example, the static NFC tag 230 may be encoded with data associated with the apparatus 200 such as, for example, a printer model number, a serial number, a website address, or the like. The static NFC tag 230 may be described as "static" due to the fact that the data encoded on the tag may not be directly modifiable by the apparatus 200 or the NFC enabled device 240. For example, the static NFC tag 230 may be encoded and affixed to the apparatus 200 by a manufacturer of the apparatus 200. Example embodiments of the invention relating to the use of such static NFC tags are described in connection with FIGS. 7, 9, and 10 below. The use of the term "static" as described herein is intended to refer to the fact that the data is unchanged unless and until rewritten. The use of the term "static" should not be construed to mean that the data is not modifiable or is "read-only", but rather that to contrast the tag with descriptions of data encoded using an NFC emulator. As such, although the apparatus 200 or NFC enabled device 240 may not modify the static NFC tag 230, the static NFC tag 230 may be provided in either a read-only or any other writable or rewritable format, and combinations thereof (e.g., some sectors set read-only and others writable, one or more sectors in a "write-once" format where they cannot be rewritten after being written to once, one or more sectors being encrypted, or the like). For example, the term "static" NFC tag may include non-emulated, traditionally programmed NFC tags, regardless of the read-only or writable status of said NFC tags.

The apparatus 200 may include print hardware 234 and a communications interface 220 with an NFC antenna and associated circuitry 221. The apparatus 200 may be configured to support near field communications via utilization of a processor 205, a memory device 210, a user interface 215, the communication interface 220, print hardware 234, and an NFC manager 232.

The processor 205 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (for example, oscillator), other circuitry, and the like to facilitate performance of the functionality described herein. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as, or is part of, an ASIC, FPGA, or the like, the processor 205 is specifically configured hardware for conducting the operations described herein. Alternatively, in example embodiments where the processor 205 is embodied as an executor of instructions or computer program code stored on a non-transitory computer-readable storage medium, the instructions specifically configure the processor 205 to perform the algorithms and operations described herein. In some example embodiments, the processor 205 is a processor of a specific device (e.g., a printer) configured for employing example embodiments of the present invention by further configuration of the processor 205 via executed instructions for performing the algorithms, methods, and operations described herein.

The memory device 210 may be one or more non-transitory computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices or the like. Memory device 210 may include a cache area for temporary storage of data. In this regard, some or all of memory device 210 may be included within the processor 205.

Further, the memory device 210, which may be one or more memory devices, may be configured to store information, data, applications, computer-readable program code instructions, and/or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The communication interface 220 may be any device or means (for example, circuitry) embodied in hardware, a computer program product, or a combination of hardware and a computer program product that is configured to receive and/or transmit data from/to a network 225, an NFC enabled device 240, and/or any other device or module in communication with the example apparatus 200. In this regard, the communication interface 220 may include the antenna and circuitry required to conduct near field communications with another NFC enabled device, such as for example a smart phone. The communications interface may be configured to communicate information via any type of wired or wireless connection, and via any type of communications protocol, such as a communications protocol that supports near field communications. According to various example embodiments, the communication interface 220 may be configured to support the transmission and reception of communications in a variety of networks including, but not limited to Internet Protocol-based networks (for example, the Internet) or the like. Further, the communications interface 220 may be configured to support device-to-device communications. Processor 205 may also be configured to facilitate communications via the communications interface 220 by, for example, controlling hardware comprised within the communications interface 220. In this regard, the communication interface 220 may comprise, for example, communications driver circuitry, one or more antennas, a transmitter, a receiver, a transceiver and/or supporting hardware, including, for example, a processor for enabling communications.

The user interface 215 may be in communication with the processor 205 to receive user input via the user interface 215 and/or to present output to a user as, for example, audible, visual, mechanical or other output indications. The user interface 215 may include, for example, a keyboard or keypad, a display (for example, a touch screen display), or other input/output mechanisms. Further, the processor 205 may comprise, or be in communication with, user interface circuitry configured to control at least some functions of one or more elements of the user interface. The processor 205 and/or user interface circuitry may be configured to control one or more functions of one or more elements of the user interface through computer program instructions (for example, software and/or firmware) stored on a memory accessible to the processor 205 (for example, volatile memory, non-volatile memory, and/or the like). In some example embodiments, the user interface circuitry is configured to facilitate user control of at least some functions of the apparatus 200 through the use of a display and configured to respond to user inputs. The processor 205 may also comprise, or be in communication with, display circuitry configured to display at least a portion of a user interface, the display and the display circuitry configured to facilitate user control of at least some functions of the apparatus 200.

The print hardware 234 may include the various hardware devices and components that support printing on a media, programming an RFID tag, or otherwise encoding information in a physical medium. In this regard, the print hardware 234 may include rollers, platens, motor operators, print heads, print ribbons, and other hardware configured to support printing on a media. A print job manager may be embodied in hardware (e.g., in the form of an ASIC or FPGA) or as instructions executed by the processor 205 to control the operation of printing. In this regard, the apparatus 200 may be configured to receive a print job, and under the control of the print job manager, the apparatus 200 may print information or a design on a media. The print job manager may also be configured to manage spooling and buffering of print jobs.

The NFC manager 232 may be embodied in hardware (e.g., in the form of an ASIC or FPGA) or as instructions executed by the processor 205 to support the implementation of near field communications as described herein.

The apparatus 200 may be a printer, such as the printer 100, and thus the printer may provide the ability to communicate via the NFC circuitry 221 of the communications interface 220. The printer may leverage near field communications in a wide variety of functionalities. Example embodiments implementing near field communications in relation to printer technologies are described in connection with FIGS. 5-10, below.

The NFC enabled device 240 may be configured similarly to the apparatus 200, with a processor 242 in communication with a memory device 244 and a user interface 246. For example, the NFC enabled device 240 may be a computing device featuring one or more communication protocols for interfacing with the apparatus 200. The NFC enabled device 240 may be configured to read or write data via near field communications, and to send or receive data via a wired or wireless network connection, such as Bluetooth, 802.11, or Ethernet. The NFC enabled device 240 may execute one or more applications stored in the memory device 244 via the processor 242 for the purpose of performing various actions based on or in view of NFC data provided to or by the apparatus 200. Example embodiments of the NFC enabled device 240 include a smart phone (e.g., the smart phone 110 described with respect to FIG. 1), a laptop or desktop computer equipped with appropriate circuitry to interface with an NFC tag, a hand-held NFC reader device, or any other device capable of sending and receiving data via near field communications.

As described above, the NFC enabled device 240 may be configured to receive instructions from the static NFC tag 230 according to data stored on the static NFC tag 230. For example, in response to accessing the static NFC tag 230 (e.g., bringing the NFC enabled device 240 in close proximity with the static NFC tag 230), one or more applications may be launched on the mobile terminal (e.g., navigation to a website associated with the printer 200, initiation of a maintenance operation for the printer, etc.).

Figure 3:
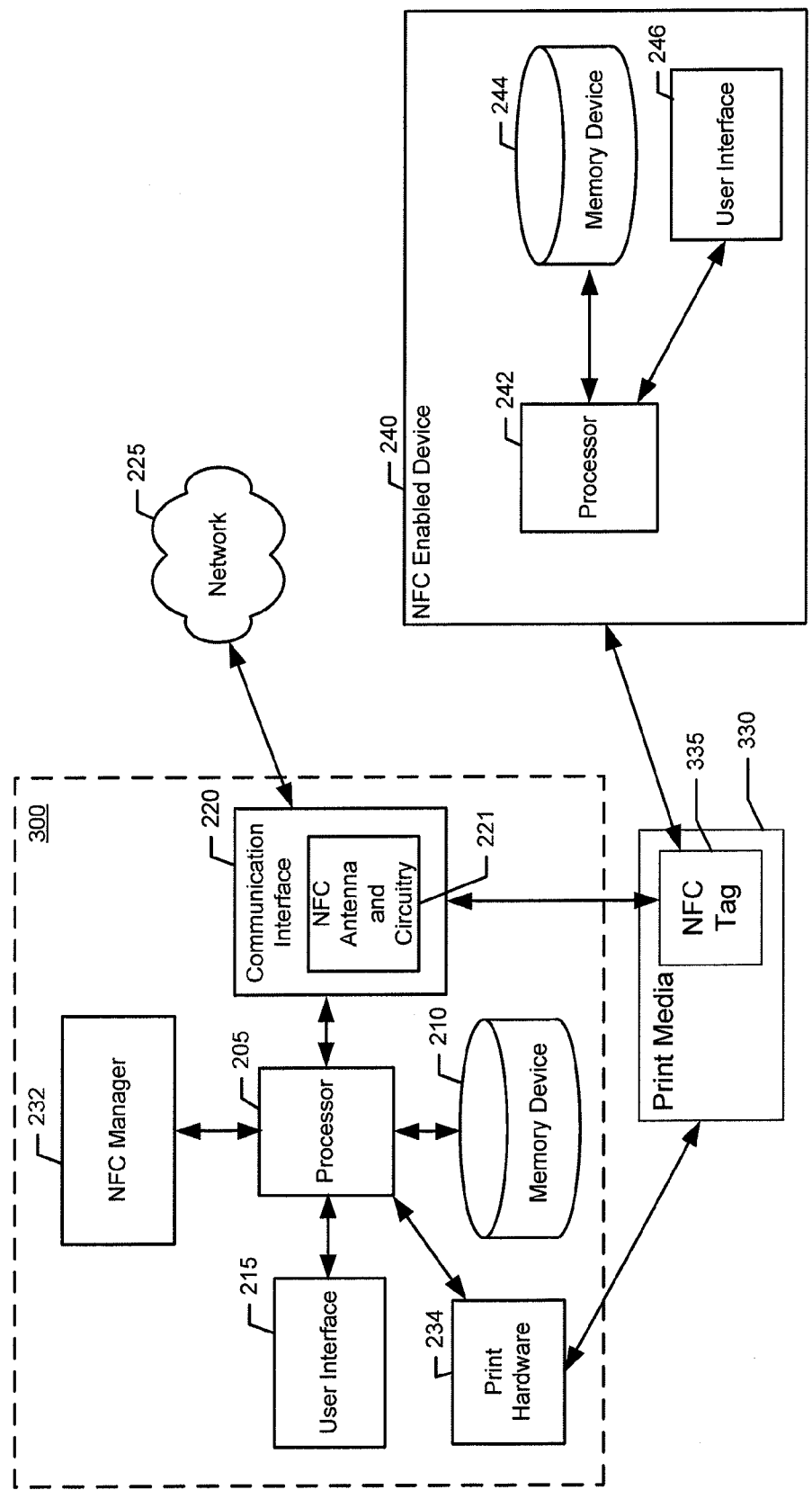
FIG. 3 is a block diagram of an example printing apparatus for encoding NFC tags on print media according to various example embodiments.

FIG. 3 depicts a block diagram of an example of an apparatus 300 including an external NFC tag 335, where an NFC enabled device 340 is in communication with the external NFC tag 335 embedded in a print media 330. The external NFC tag 330 may be implemented as a chip, a label, a sticker, or a device embedded or otherwise attached to the print media 330, where the external NFC tag 330 is operable to respond to an NFC field with a particular set of data. In the present example, the external NFC tag 330 may be encoded with data by the apparatus 300 during a print operation, such as an operation performed by print hardware 234. The apparatus 300 may be a printer that encodes print media with NFC data during a print operation. For example, the printer 300 may be operable to print a driver's license and encode an external NFC tag embedded in the driver's license with the driver's name, contact information, or license number. The apparatus 300 may be configured similarly to the apparatus 200 described above with respect to FIG. 2. Like reference numerals have been used to illustrate like components across the two apparatuses. For example, the apparatus 300 may be configured with a processor 205 in communication with a memory device 210, an NFC manager 232, a user interface 215, print hardware 234, and a communication interface 220. As with the static NFC tag 230, the external NFC tag 230 may be operable to communicate with an NFC enabled device 240. Example embodiments of the invention relating to the use of external NFC tags are described in connection with FIG. 5 below.

Figure 4:
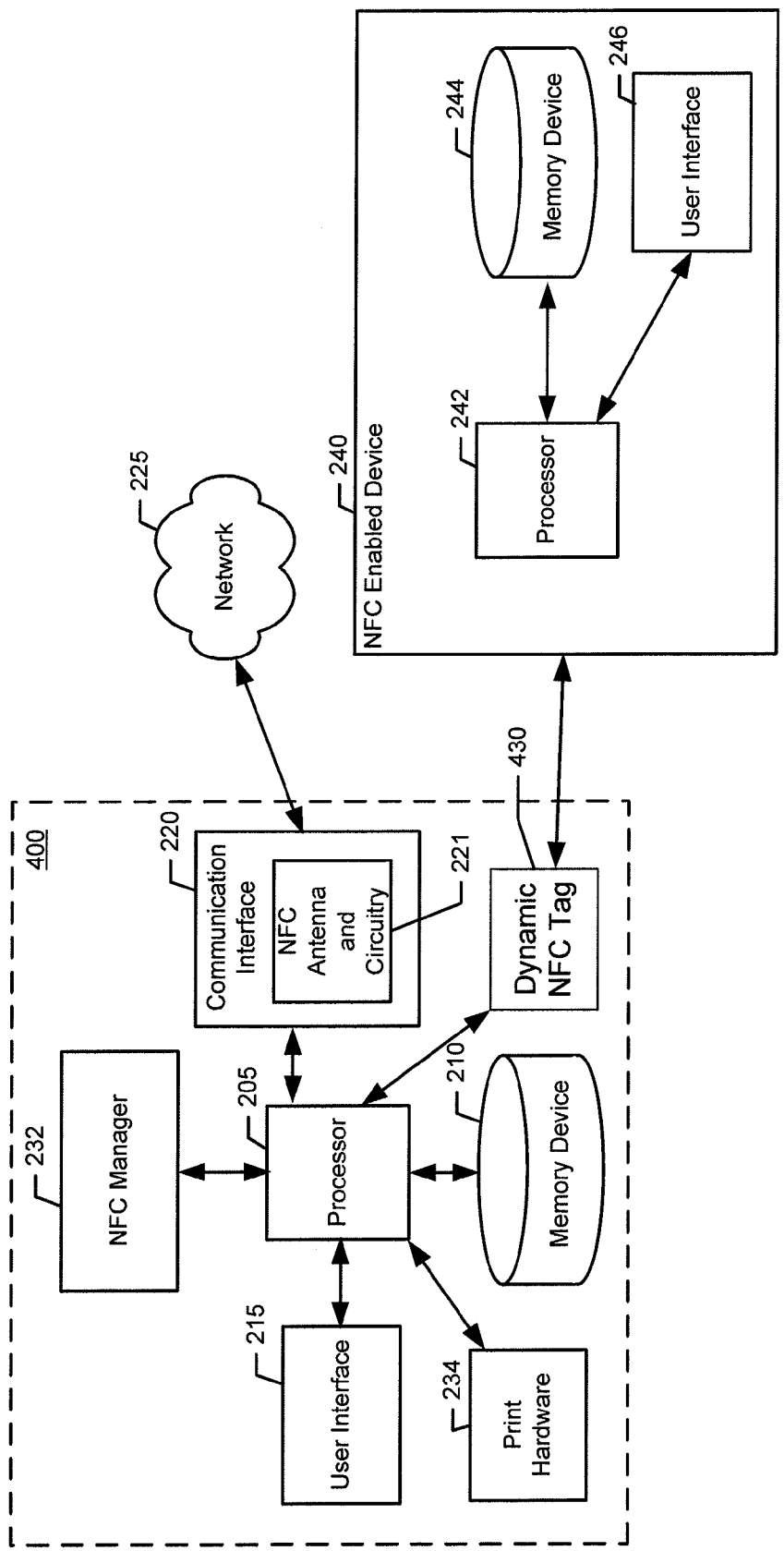
FIG. 4 is a block diagram of an example printing apparatus using a dynamic NFC tag according to various example embodiments.

FIG. 4 depicts a block diagram of an example of an apparatus 400 in communication with an NFC enabled device 240 via a dynamic NFC tag 430. As described with respect to the static NFC tag 230 described with respect to FIG. 2, the dynamic NFC tag 430 may be implemented as a chip, a label, a sticker, or a device that is operable to be programmed by a processor in electronic communication with the dynamic tag 430 and to respond to an NFC field with a particular set of data. The dynamic NFC tag 430 may be configured such that data encoded on the dynamic NFC tag 430 may be modified or otherwise written by the apparatus 400. Implementations of the dynamic NFC tag 430 may include circuitry that is dynamically configurable by the printer through a circuitry connection other than an NFC interface. For example, the dynamic NFC tag 430 may be coupled to the processor 205 via a cable, a printed circuit board, or physical interface. The dynamic NFC tag 430 may be a NFC emulator, providing functionality like an NFC tag while being programmable by a processor in electronic communication with the NFC emulator. For the purposes of this application, the term electronic communication relates to communication provided using electricity, such as provided by leads, wires, traces, and other electronic connections. As used herein, the term electronic communication is understood to exclude radio forms of communication such as NFC. The processor 205 may thus control the contents of the dynamic NFC tag 430 via this interface. The dynamic NFC tag 430 may be read by the NFC enabled device 240 to read the data programmed onto the dynamic NFC tag 430 by the processor 205. For example, the dynamic NFC tag 430 may be a RC-S801, RC-S802, or RC-S926 Dynamic NFC Tag as manufactured by Sony®.

The apparatus 400 may be configured similarly to the apparatus 200 described above with respect to FIGS. 2 and 3. Like reference numerals have been used to illustrate like components across the two apparatuses. For example, the apparatus 400 may be configured with a processor 205 in communication with a memory device 210, an NFC manager 232, a user interface 215, print hardware 234, and a communication interface 220. The dynamic NFC tag 430 may be reprogrammable by elements of the apparatus, such as the communication interface 220. For example, the processor 205 may direct the communication interface 220 to store new information on the tag, such as a printer status or network configuration data. The processor 205 may further direct the communication interface 220 to add, delete, or modify the data encoded on the dynamic NFC tag 430 during runtime operations. As with the static NFC tag 230, the dynamic NFC tag 430 may be operable to communicate with an NFC enabled device 240. Example embodiments of the invention relating to the use of dynamic NFC tags 430 are described in connection with FIG. 8, below.

Figure 5:
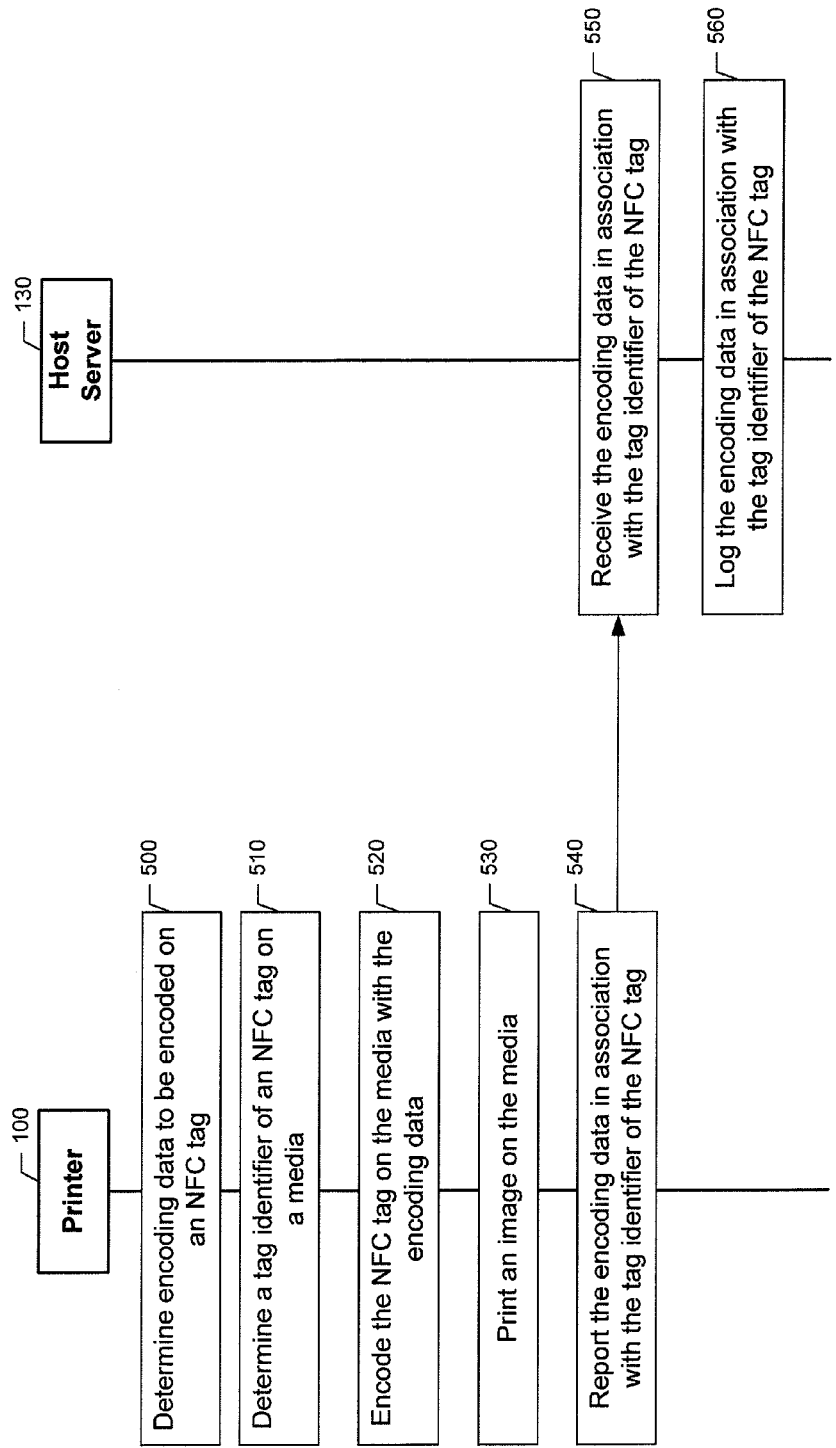
FIG. 5 is a signaling flowchart for encoding and logging NFC tags according to various example embodiments.

Referring to FIG. 5, the printer 100 (alternately or additionally the apparatus 200, 300, or 400) may be configured to encode an NFC tag and communicate information associated with the encoding to a host server 130 to be logged. In this regard, the printer 100 may be configured to determine encoding data to be encoded on an NFC tag at 500. The encoding data may be determined by receiving the data from another device, the encoding data may be stored on a memory device of the printer 100, or the printer 100 may determine the encoding data using an algorithm that generates, for example, a data sequence. In some example embodiments, the encoding data may be data associated with a retail product (e.g., a Universal Product Code (UPC) or electronic product code (epc)).

The printer 100 may also determine a tag identifier of an NFC tag that is affixed, embedded, or otherwise associated with a media at 510. To determine the tag identifier the printer may use near field communications to receive the identifier from the NFC tag. The printer may then encode the NFC tag on the media with the encoding data using near field communications at 520. According to some example embodiments, the printer may also print an image on the media at 530.

At 540, the printer 100 may report the encoding data in association with the tag identifier of the NFC tag to a host server 130. The host server 130 may receive the encoding data in association with the tag identifier of the NFC tag at 550, and log or store the encoding data in association with the tag identifier of the NFC tag. According to some example embodiments, the encoding data and the tag identifier may be stored in a database on the host server. It is recognized that while the content of FIG. 5 is described in a particular order, it is understood that many of the operations may be performed in a different order.

In some embodiments, the NFC tag may include a locked set of data and an unlocked set of data. For example, a portion of the data encoded on the NFC tag may be set to a "read only" mode, via a data value or bit flag. The locked set of data may be set to a read only state at the time the tag is initially encoded, such as when the device is manufactured. For example, a printer manufacturer may encode the NFC tag with a set of default and/or fixed values for that particular printer at the time of manufacture. The unlocked set of data may be modifiable by an NFC enabled device or the printer itself. In some embodiments, when a configuration change occurs to the printer (e.g., updating printer firmware), the unlocked set of data may be updated by the printer or an NFC enabled device. Such configuration changes may also be stored in a database or on a website associated with the printer 100. As the configuration change occurs, the unlocked set of data may be modified to include the new configuration change (e.g., including an updated firmware version in the unlocked set of data). Once the unlocked set of data is modified, it may be locked.

When an NFC enabled device accesses the tag, the NFC enabled device may determine whether a particular portion of the set of data encoded on the tag (e.g., the set of data that was originally unlocked) is locked. If the set of data is locked, the NFC enabled device may determine that the printer has been modified from its original configuration. If the set of data is not locked, the NFC enabled device may determine that the printer is in a default configuration. If the printer has been modified, the NFC enabled device may retrieve data from the database for the configuration of the printer. If the printer has not been modified, then the NFC enabled device may provide a default set of configuration values for the printer, without the need to access the database, since the printer can be assumed to be in a "stock" configuration by virtue of the fact that the NFC tag remains unlocked. For example, an NFC tag may be implemented with multiple sectors in a locked state, with one or more sectors available to accept new data. An NFC device may be programmed to interact with the NFC tag during a printer configuration operation, such that when the printer's configuration is changed, one or more of the unlocked sectors are modified. The sectors may be locked after modification, and upon performing the configuration update to the printer, the NFC device may further update a remote database with the new configuration information. When the NFC tag is read by an NFC device in the future, the NFC device may determine whether the previously unlocked sectors have been modified. For example, the NFC device may determine if data has changed in these unlocked sectors from default values, or the NFC device may determine whether a read-only flag has been set for the previously unlocked sectors. In response to detection of a modification to these sectors, the NFC device may access a remote database to determine the latest configuration of the printer, while if the one or more sectors have not changed, then the NFC device may obtain printer information from the NFC tag. In this manner, the status of the one or more sectors may be used by the NFC device to determine whether printer data should be retrieved from the tag or from the remote database instead.

Alternately or additionally, the NFC tag may be locked and associated with a particular network address. As changes are made to the configuration of the printer, the data associated with the network address (e.g., a website) may be updated. Thus, an NFC enabled device that accesses the NFC tag may be directed to the network address for updated status and/or configuration information about the printer.

In some embodiments, the NFC tag may be locked by modifying a single bit or set of bits that indicate a read-only status. Many NFC devices determine whether the tag is writable by checking the status of this bit. NFC tags may also be physically "locked" where any further modification of the tag is physically disabled. In some circumstances, tags are locked by both marking the read-only flag, and then physically disabling the ability to write to the tag.

Figure 6:
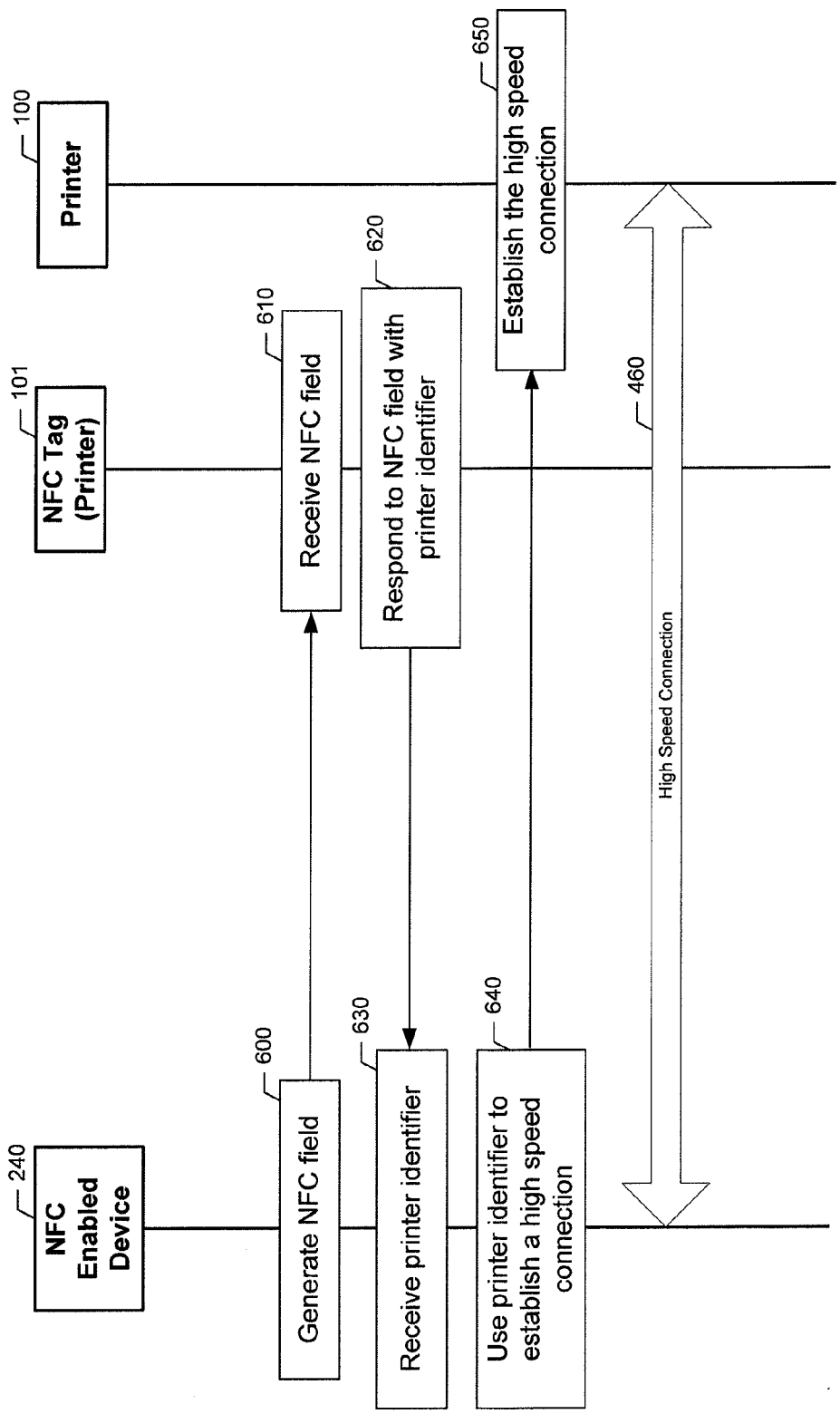
FIG. 6 is a signaling flow diagram for pairing an NFC enabled device with a printer according to various example embodiments.

However, embodiments may also provide the ability to modify the single bit or set of bits to indicate that the tag is read only, while not actually disabling the ability to write to the tag. This implementation may function to indicate to most NFC devices that the tag is read-only, but devices which are aware of the fact that the tag is not actually read-only may possess the ability to ignore the read-only indication and write to the NFC tag anyway. For example, an NFC device may be configured to check additional data encoded on the tag to determine if the tag is configured to be writable even if the read-only flag has been selected. For example, the NFC device may be programmed to disregard the read-only flag if the NFC tag can be identified, either by reading data encoded on the tag or by receiving data about the NFC tag from an external source, as being encoded by a particular manufacturer, in a particular format, with a particular data value, or that the tag is associated with a particular printer model number or serial number. In this manner, NFC devices that are programmed to treat the tag as read-only in response to checking the read-only flag will not be able to write to the tag, but other NFC devices that are specifically programmed to disregard the read-only tag (or to disregard the read-only tag in certain circumstances, such as upon detection of other data on the tag), may still be able to modify data on the NFC tag or otherwise write to the NFC tag. FIG. 6 illustrates a signaling flow diagram for establishing a network connection between an NFC enabled device, such as the NFC enabled device 240 described with respect to FIG. 2, with a printer 100 (alternately or additionally an apparatus 200, 300, or 400) using an NFC tag 101 that is associated with the printer 100. In certain operating environments, it may be difficult to establish a network connection with a particular printer. The network address or login information of the printer may not be known to a device that wishes to connect with the printer, or the printer may not make itself publicly known on the network. By using NFC technology to provide such information, an NFC enabled device may read network information encoded on an NFC tag associated with the printer, and establish a network connection to the printer via another protocol, such as Bluetooth or 802.11.

For example, an NFC enabled device may tap a tag associated with a printer to determine the printer's internet protocol address, user id, and password. The process described with respect to FIG. 6 illustrates a process for initiating such a network connection. In some embodiments, the network connection may be used to enable a remote interface to the printer, such as to initiate print jobs or perform maintenance operations. Network information provided via near field communications in this manner may ensure that the NFC enabled device 240 establishing the network connection is within a close proximity to the tag. The short range nature of near field communication provides a security benefit in that the user of the device that establishes the network connection must be in close proximity to read the network information stored on the tag. The use of NFC also reduces the chance for cross-talk with other network devices in the area, to ensure that the user of the mobile terminal establishes the network connection with the correct printer. In some embodiments, the network information stored on the NFC tag may be encrypted, such that only certain NFC enabled devices (e.g., an authorized device issued to a certified printer technician) may establish the network connection in this manner by using a public/private key encryption process.

In some example embodiments, defined printer settings on an NFC enabled device may be transmitted via near field communication to automatically update the settings on the printer when an NFC connection is established. For example, the settings may include compatible media, device burn tables (e.g., heat settings for particular printers and/or media), or the like. The NFC enabled device with the defined settings may be repeatedly used with a number of printers to update the settings on each of the printers. As such, the NFC enabled device with the defined setting may be used to standardize the settings on a number of printers. In a similar manner, the settings may be defined and transmitted using near field communications to optimize the printer for a particular task (e.g., for a particular print job).

An NFC enabled device 240 may be configured to generate an NFC field at 600. The NFC tag 101 associated with the printer may receive the field at 610 and respond to the field with a printer identifier at 620. At 630, the NFC enabled device 240 may receive the printer identifier.

The NFC enabled device 240 may be configured to use the printer identifier, which may be a Bluetooth address, an IP address, a MAC address, or the like, to establish a connection (i.e., a non-near field communications connection) with the printer 100 at 640. The connection may be a higher speed connection other than a near field communications connection, such as, for example, a Bluetooth, Wi-Fi, or other wireless connection. At 650, the printer 100 may receive a request to establish the connection using the printer identifier and the connection may be established at 460 to pair the smart phone 110 with the printer 100.

Figure 7:
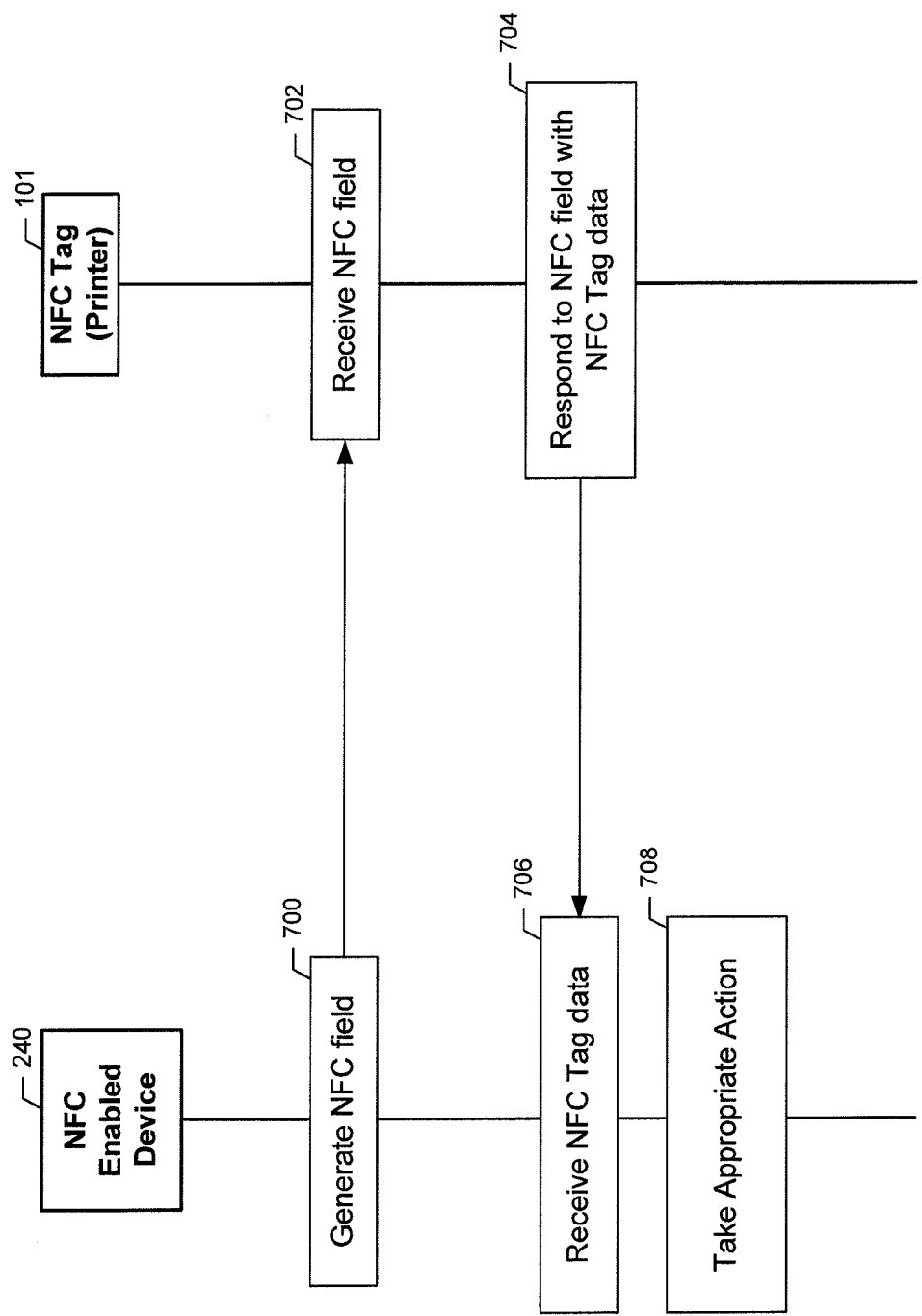
FIG. 7 is a signaling flowchart for performing actions in response to NFC data received from a printer NFC tag according to various example embodiments.

FIG. 7 is a signaling flowchart for performing actions in response to NFC data received from a printer NFC tag according to various example embodiments. As described above with respect to FIGS. 1-4, an NFC enabled device, such as a smart phone, may communicate with an NFC tag associated with a printer. The NFC tag may include data describing the serial number, model, component identifiers, or other features of the printer. The process described with respect to FIG. 7 illustrates example embodiments of the interactions between an NFC enabled device and a printer associated with such a tag.

As described with respect to FIG. 6, the NFC enabled device (e.g., the NFC enabled device 240 described with respect to FIG. 2) may generate an NFC field to communicate with an NFC tag 101 associated with a printer. Similarly to the process described with respect to FIG. 6, at actions 702 and 704, the NFC enabled device 240 and the NFC tag 101 may respectively generate and receive an NFC field to initiate the communication process. At action 704, data encoded on the NFC tag 101 is transmitted to the NFC enabled device 240. At action 706, the NFC enabled device 240 receives the transmitted data.

At action 708, the NFC enabled device 240 may take appropriate action based on the received data. The received data may be comprised of a variety of data formats and/or content types. For example, the data may include printer identifiers (e.g., a printer serial number or model number), component identifiers (e.g., a print head serial number or model number), printer network information (e.g., a medium access control address of the printer or Bluetooth pairing information), printer login information (e.g., a serial number and a password for accessing an administrative function of the printer), warranty information (e.g., a printer purchase date or service plan information), an address of network content (e.g., a uniform resource locator of the printer's manufacturer), or a data file (e.g., an owner's manual for the printer).

In some embodiments, the NFC enabled device 240 may be specially configured for processing the data received from the NFC tag 101. For example, the NFC enabled device 240 may be a smart phone executing an "app" designed to receive information from the NFC tag 101. The NFC enabled device 240 may perform a variety of processing functions in response to receipt of the data from the NFC tag 101.

In some embodiments, the NFC enabled device 240 may be configured to provide information describing the particular printer associated with the NFC tag 101. As described above, the information may include a model number of the printer, a serial number of the printer, a serial number of the print head, or the MAC address of the printer. Such data may be used by the NFC enabled device 240 for identifying the printer in inventory operations or in service requests, or in any other process where such information might be useful. The NFC tag 101 may include an NDEF record for a particular URL for a website that provides information about the printer, an NDEF record that launches a printer maintenance application executing on the NFC enabled device 240, an NDEF record to initiate a media ordering process, or any other application relevant to the operation of the printer.

In some embodiments, the NFC enabled device 240 may be configured to initiate a network connection using data received from the NFC tag 101. For example, the NFC tag 101 may provide the NFC enabled device 240 with a network address of the printer, login credentials to interface with the printer over a network protocol, or other data to facilitate communication with the printer. For example, the process described with respect to FIG. 6 illustrates a method for enabling a high-speed connection with a printer according to example embodiments of the invention. A network connection established in this manner may be used to perform diagnostics or maintenance operations, and/or initiate print jobs. For example, a user may select a particular label to be printed, or the user may select a recently printed label to be reprinted via the NFC enabled device. In some embodiments, the NFC enabled device 240 may be configured with an application that enables a user interface of the NFC enabled device 240 to function as a user interface for the printer via a network connection established by receiving NFC data from the printer.

In some embodiments, the NFC enabled device 240 may be configured to read a status of a printer during a physical process, such as manufacturing, shipping, or deploying the printer. The NFC tag 101 may be encoded and re-encoded with information identifying the specific printer and its position within the process as that process proceeds. Upon completion of a process stage (e.g., boxing or unboxing of the printer, affixing a particular part of component, arrival at a central warehouse for distribution), the NFC tag 101 may be re-encoded with data indicating that the stage of the process has been completed. Tracking such data may allow for elimination of paperwork and manual status tracking, improving process efficiency and reducing risk of loss or inventory shrink. In some embodiments, the NFC enabled device 240 may be configured to read a file or network address from the NFC tag 101. The file or network address may provide the NFC enabled device 240 with information to assist a user with operating, configuring, or otherwise interacting with the printer associated with the NFC tag 101. For example, the NFC tag 101 may include a network address (e.g., a URL) for a management application for installation on a smart phone. In this manner, the NFC tag 101 may "bootstrap" the other features of the data provided by the NFC tag 101, by prompting a user to download a full-featured management application using a browser or other device configured to receive network addresses via near field communications. The address or file specified by the NFC tag 101 may also provide the user with particular information about the printer, such as a user manual, an installation video, an address for a customer portal, or a link to a "how to" section of a web page. The NFC tag 101 may also provide the user with an address of a website for use in ordering replacement media, (e.g., ink, toner, labels, or thermal paper), for the printer.

In some embodiments, the NFC enabled device 240 may be configured to receive information describing compatible media for the printer associated with the NFC tag 101. For example, the NFC tag 101 may provide the NFC enabled device with information indicating the types of inks, ribbons, or other media that are compatible with the printer. In some embodiments, the NFC enabled device 240 may be configured to enable a user to order or re-order such compatible media in response to receiving the compatible media information from the NFC tag 101. For example, the NFC tag 101 may include an NDEF record that directs the NFC enabled device 240 to launch a browser window directed to an e-commerce interface for reordering printer media, or an NDEF record that launches a printer maintenance application on the NFC enabled device 240.

In some embodiments, the NFC enabled device 240 may be configured to receive information describing warranty information for the printer associated with the NFC tag 101. Warranty information, such as the date the printer was manufactured, the date it was purchased, and the date of the last service may be encoded on the NFC tag 101. If the printer later needs service, such information may be read from the NFC tag 101 to determine warranty eligibility and to streamline the processing of the repair. In some embodiments, the warranty information may be modified at the time of service by a technician performing a repair, or at other points in the service process. The warranty information may also indicate whether the user has purchased an extended warranty, insurance, or service contract, and the NFC tag 101 may be further encoded to indicate as such at the time of said purchase.

In some embodiments, the NFC enabled device 240 may be the printer itself, and the printer may access the NFC tag 101 to retrieve data. For example, the NFC tag 101 might be encoded with customer data, such as network data, during the manufacturing or shipping process. At boot time, the printer 101 may access the data on the NFC tag, for example, to configure the printer for communication on the customer's network. In this manner, elements of the printer, such as the wireless subsystem, may access the data encoded on the NFC tag 101 to simplify installation and configuration for the customer's particular operating environment.

In some embodiments, printer specific information encoded on the NFC tag 101 may be used to manage the printer as a workforce asset. Users may be assigned printers with near field communications technology as part of their workplace duties. The users may be required to check out a printer at the beginning of a shift and check the printer back in at the end of the shift. The check out and check in operations may be performed by scanning a NFC tag associated with the printer to register the printer's serial number. These scan operations may be used to manage printer assets, to track losses, to monitor usage of the assets, or to perform time-clock operations for the assigner to whom the printer is assigned. The NFC tag may also be encoded with status information for management of the assets, such as described below with respect to FIG. 6.

Figure 8:
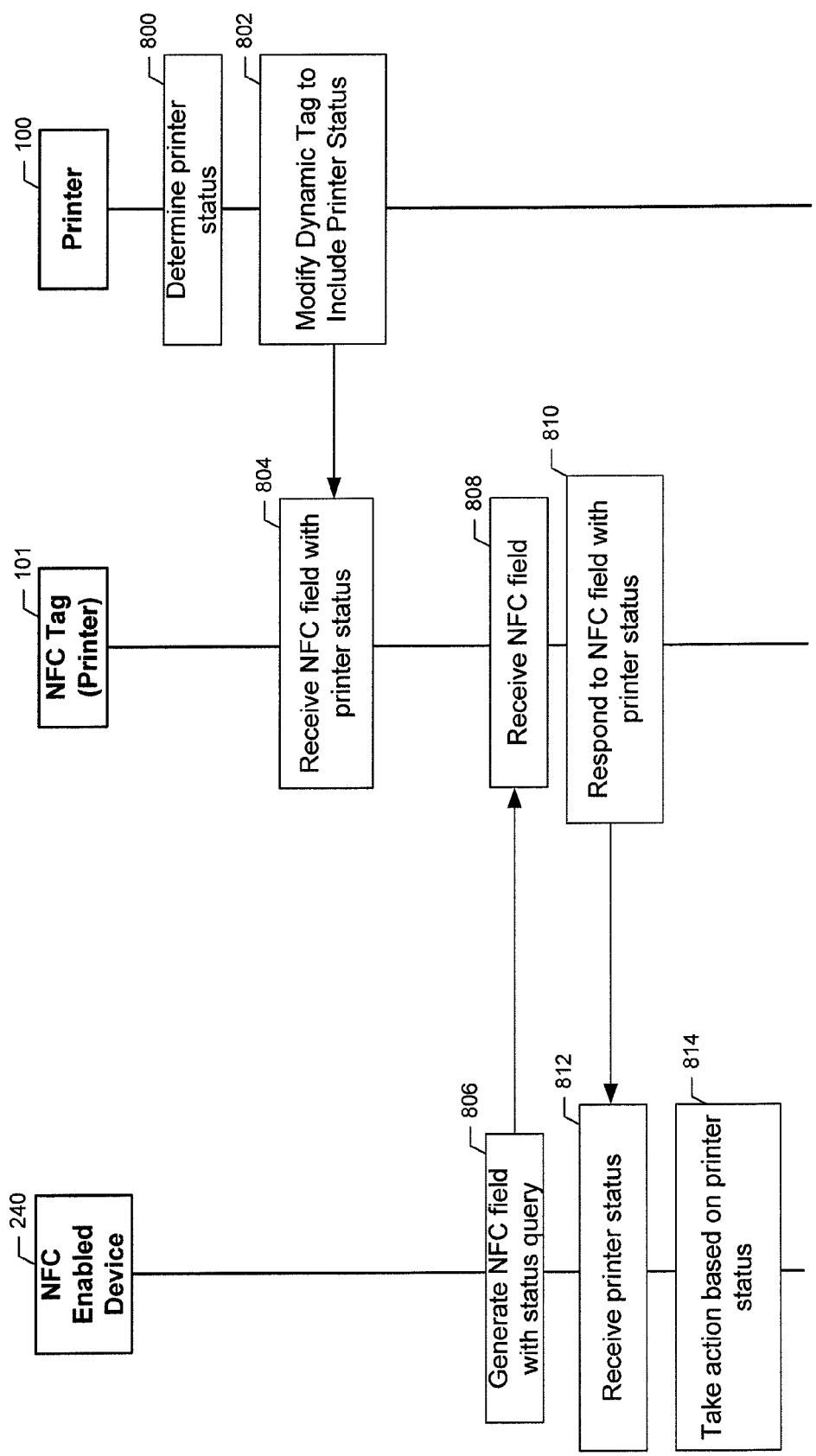
FIG. 8 is a signaling flow diagram for receiving printer status information from a printer NFC tag according to various example embodiments.

FIG. 8 is a signaling flow diagram for receiving printer status information from a printer NFC tag according to various example embodiments. As described above with respect to FIGS. 1-4, an NFC enabled device, such as a smart phone, may communicate with an NFC tag associated with a printer. In some embodiments, the NFC tag, such as the dynamic NFC tag 430 described with respect to FIG. 4, may be programmed by the printer via circuitry coupled to the printer and the tag (e.g., a printer controller electronically coupled to an NFC tag emulator). For example, the printer may encode the NFC tag emulator with a printer status to indicate the operational state of the printer. For example, the NFC tag emulator may indicate the current state of the printer (e.g., online, offline, sleep mode, warming up) or an error condition of the printer (e.g., low ink level, low media level, a ribbon out indication). The process described with respect to FIG. 8 illustrates example embodiments of the interactions between an NFC enabled device and a printer having such a programmable NFC tag emulator.

At action 800, a printer 100 may determine a current status. The status may be received via hardware or software methods. For example, the printer 100 may execute diagnostic software, perform a maintenance operation, print and scan an alignment page or the like. As a result of the status determination, the printer may identify whether the printer is in a fully operational state, whether one or more components are offline, the ink level, the amount of paper, the network status of the printer, or the like.

At action 802, the printer 100 may generate an NFC field to program an NFC tag emulator coupled to the printer 100 with the status of the printer 100. At action 804, the NFC tag emulator may receive the status data provided by the printer 100 from the printer controller.

At action 806, an NFC enabled device 240 may generate an NFC field to query the status of the tag. For example, an application executing on a smart phone or other device may query the tag to determine whether the printer needs to be serviced. At action 808, the NFC tag emulator receives the NFC field generated by the NFC enabled device 240, and at action 810 the NFC tag emulator responds with the status information via NFC.

At action 812 the NFC enabled device 240 receives the printer status from the NFC tag emulator, and at action 614 the NFC enabled device 240 takes action in response to the received status. The action taken by the NFC enabled device 240 may vary depending upon the type and content of the status information received from the NFC tag emulator.

In some embodiments, the printer status information may comprise troubleshooting data or errors recorded by a diagnostic or maintenance operation performed by the printer. For example, the NFC enabled device 240 may execute an application designed to read error codes from the printer 100 via the NFC tag emulator. These error codes may define various error conditions. For example, the error codes may include a paper jam error indication, a ribbon out indication, a media out indication, an ink level indication, a non-authentic media indication, or any other diagnostic code that might be useful for operating and/or maintaining the printer. The printer 100 may program the NFC tag emulator with error codes recorded during the maintenance operation, and the NFC enabled device 240 may read the error code and suggest troubleshooting steps to a user. In some embodiments, the NFC enabled device 240 may transmit the status information or error codes to a server, and receive troubleshooting instructions from the server in response to the transmission of the error code. The status information may also include data indicating a consumable status (e.g., printer is low on toner, ink, ribbon, or print media).

Further, in some example embodiments, the printer 100 may be configured to transmit, via near field communication, a notification of a media outage and request replacement. The printer 100 may also transmit, via near field communication, information that may assist a user in ordering replacement media. The printer may transmit information about the type of media that is needed, and a user may simply approve the purchase of the replacement media, which may be in the form of labels, cards, or the like. In some example embodiments, the printer 100 may be configured to transmit, via near field communication, other information indicative of the status of the printer, such as recent data about the operating temperature of the printer, sensor settings, operating mode, or whether certain hardware has been installed.

Figure 9:
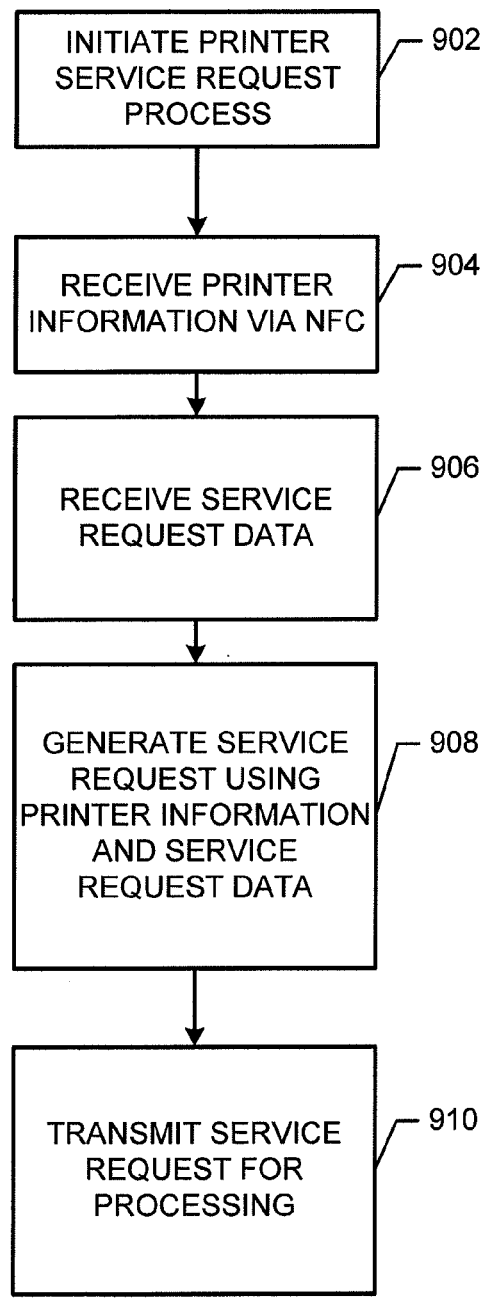
FIG. 9 is a flow diagram for initiating a printer maintenance request in response to NFC data received from a printer NFC tag according to various example embodiments.

FIG. 9 is a flow diagram illustrating a method 900 for initiating a printer maintenance request in response to NFC data received from a printer NFC tag according to various example embodiments. The method 900 is operable to request maintenance for a printer equipped with near field communications technology by communicating with an NFC tag encoded with the printer status, such as by the process described above with respect to FIG. 8. For example, an application executing on an NFC enabled device may receive status information from the printer and initiate a service request (e.g., schedule a service appointment with a technician) without requiring a user to manually input printer status information.

At action 902, a printer service request may be initiated on an NFC enabled device, such as a smart phone. The printer service request may be initiated using an application designed to interface with the printer, or the NFC enabled device may receive a communication from the NFC tag, such as by receiving an NDEF record. The NFC enabled device may be configured to take an action in response to receiving such an NDEF record. For example, the NFC enabled device may launch an application or navigate to a web page specified by the NDEF record. In some embodiments, the NFC enabled device may present a menu to a user of the NFC enabled device, allowing the user to select from one or more actions enabled by the NFC tag. For example, the NFC tag may contain records capable of launching applications to initiate a printer service request, order printer media, view a printer user manual, or the like. Each of these options may be presented to the user of the NFC enabled device, and the user may select the action to be performed. For example, the user may note that the printer is not functioning properly. In response, the user may tap their NFC enabled device (e.g., a smart phone) to the NFC tag on the printer, and be provided with a menu that allows the user to initiate a maintenance request by launching a maintenance application on their NFC enabled device.

At action 904, the NFC enabled device receives information from the printer via near field communications. As described above with respect to FIGS. 4-6, the information may be received from the printer in a variety of formats. In some embodiments, the information may include static data, such as the printer serial number or model number. In some embodiments, the information may include detailed status information for the printer. In yet further embodiments, the information may include network access information (e.g., a printer password or MAC address) to allow the NFC enabled device to establish a communications link via an alternative protocol (e.g., Bluetooth or 802.11) to query the status of the printer via the alternative protocol. In some embodiments, the information may include warranty information indicating whether the printer is covered under a warranty or service contract.

At action 906, the NFC enabled device may receive printer service request data. In some embodiments, additional information may be required other than the data received from the printer. For example, the user may include a brief description of a problem with the printer, a set of dates/times when the user would like a maintenance appointment, the user's contact information, or any other information that might be relevant to initiate a service request. In yet further embodiments, the NFC enabled device may receive a series of printer diagnostics or other troubleshooting information (e.g., via a dynamic NFC tag), and the troubleshooting information may be automatically copied into an e-mail for transmission to a printer service technician. For example, the printer may be hooked up to a company network that is not easily accessible to a user outside the network. In this manner, the user may retrieve printer diagnostic information and transmit the diagnostic information via a smart phone or other device, directly to a service technician. As such, the user is saved from having to locate the malfunctioning printer on the network and figuring out how to retrieve the troubleshooting data over the network. Although the instant example method describes initiating the service request and receiving service data as two separate elements, other implementations may include initiating the service request on the NFC enabled device by receiving a set of printer diagnostic information.

In yet further embodiments, the printer may make configuration information available via a dynamic NFC tag. For example, the printer may output its configuration settings (e.g., network information, driver information, burn tables, print head configuration information, or the like) to an NFC enabled device. The NFC enabled device may use this configuration information to configure another printer. For example, the NFC enabled device may have the ability to "mirror" the configuration read via the NFC enabled tag to other printers, either via a network interface or via an NFC interface of the other printers. In some example embodiments the printer 100 may be configured to transmit, via near field communication, information indicative of what has been stored in memory on the printer, such as fonts, graphics, custom programming, factory default settings, sales information, warranty information, maintenance information, optional printing command languages, downloadable objects, and the like.

At action 908, a service request may be initiated using the printer information and service information received at actions 904 and 906. In some aspects, whether a service request is generated may be dependent upon the data received from the printer. For example, the user may receive the printer status as part of a maintenance or diagnostic operation, and a service request may only be generated where the printer indicates a device status that the user is not capable of troubleshooting. Alternatively or additionally, the service request may be initiated by sending an e-mail with printer diagnostic information to a service technician using the NFC enabled device. In some aspects, the service request may be provided as part of a troubleshooting or maintenance wizard, such that the service request is presented after other troubleshooting methods have failed.

At action 910, the service request may be transmitted for processing. For example, upon completing the service request, an e-mail may be generated and sent to an address maintained by the printer manufacturer for the purpose of responding to service requests. The NFC enabled device may receive a confirmation that the service request has been received by the remote server, and indicate to the user of the NFC enabled device that the request will be processed.

In some embodiments, additional data may be received from a service technician to assist with troubleshooting the printer. For example, if the NFC tag is a dynamic tag, then the technician may transmit a set of configuration or diagnostic data to be transmitted to the printer via the NFC enabled device. In this manner, the technician may assist the user with troubleshooting without having to manually instruct the user to take particular remedial measures.

In some example embodiments, the printer may also have the ability to read NFC data. For example, the printer may use NFC data for access control for executing print or configuration operations on the printer. The printer may receive access information, such as user credentials, to determine if the particular user has the proper access permissions to modify the configuration of the printer. For example, the NFC enabled printer 100 may be configured to await a proper access code via near field communication before conducting printing operations. In this regard, the printer 100 may be configured to output an NFC field, and in response to receiving an NFC response including an access code, the printer 100 may be configured to authenticate the access code, and enable printing or other functionality. The NFC enabled printer 100 may be configured to receive a request for particular information and respond via near field communication with a communication including the requested information. In some example embodiments, the requested information may be error codes or messages, and the printer 100 may provide error codes or messages via near field communication to a requesting device. Similar to the implementation described above, in some example embodiments, the error codes or messages may be provided by the printer 100 only after an access code provided by the requesting device is authenticated, thereby indicating, for example, that the requesting device is associated with a trained printer repair technician.

Data may also be exchanged via NFC to configure the printer. For example, a NFC enabled device may transmit data to the dynamic NFC tag, and the transmitted data may be read by the printer from the dynamic NFC tag. For example, burn table data may be provided to the printer in this manner. For example, in one embodiment the consumable supply may be a direct thermal print media and the printer may be configured to retrieve and download, in response to receiving configuration data via the dynamic NFC tag, a specific set of burn tables to the printer device 100 that are optimized for imaging the selected media. Such burn tables may consist of coefficients for algorithms that determine the timing and duration of heat pulses applied during thermal printing from thermal print head elements, based on a pattern of past, present, and future intended printed indicia arrayed across the print head.

Figure 10:
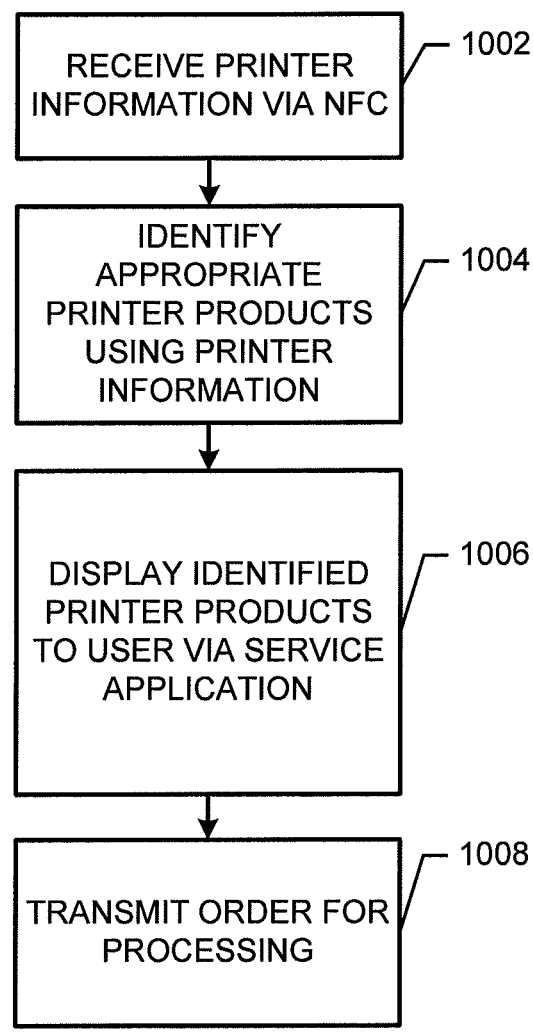
FIG. 10 is a flow diagram for using printer NFC information to generate an order for printer services according to various example embodiments.

FIG. 10 is a flow diagram illustrating a method 1000 for using information received from a printer by near field communications to generate an order for printer services according to various example embodiments. Near field communications may be used to simplify the process of ordering supplies or replacement parts for a properly enabled printer. The method 1000 is operable to simplify this process by allowing an NFC enabled device, such as a smart phone, to receive printer information and suggest compatible products to a user of the NFC enabled device.

At action 1002, the NFC enabled device may receive information from the printer via near field communications. The information received by the NFC enabled device may be of various types and contents, as described above with respect to FIGS. 3-8. For example, the NFC enabled device may receive a serial number or model number of the printer, the current status of the printer, or information describing compatible media or consumables for the printer. In some embodiments, receiving data from the NFC tag may execute a printer maintenance application on the NFC enabled device. For example, the NFC tag may include an NDEF record that instructs the NFC enabled device to launch the printer maintenance application. Alternately or additionally, the NFC tag may have an NDEF record with a URL or IP address for a network destination associated with the printer (e.g., a manufacturer website or a printer IP address), and the URL or IP address may be opened in a browser on the NFC enabled device.

At action 1004, the NFC enabled device may identify compatible products or services for the printer based on the information received at action 804. The NFC enabled device may perform a lookup operation using the information received from the printer (e.g., querying a local or remote data store using the model number or serial number of the printer) to identify the compatible products or services. For example, the NFC enabled device may identify an appropriate replacement ink, media, battery, print head, or the like. The NFC enabled device may also identify costs for service, maintenance, or warranty plans for the printer.

At action 1006, the NFC enabled device may provide the user with an interface to order the products or services identified at action 1006. The NFC enabled device may include an e-commerce interface allowing the user to select and order the supplies directly, such as from the printer manufacturer. The NFC enabled device may perform functionality consistent with an online store front end, allowing the user to request, order, and pay for selected products or services. At action 1010, the NFC enabled device may transmit an order or service request to a remote server for processing. The remote server may process the order and arrange for delivery of a product or service to the user of the printer.

Figure 11:
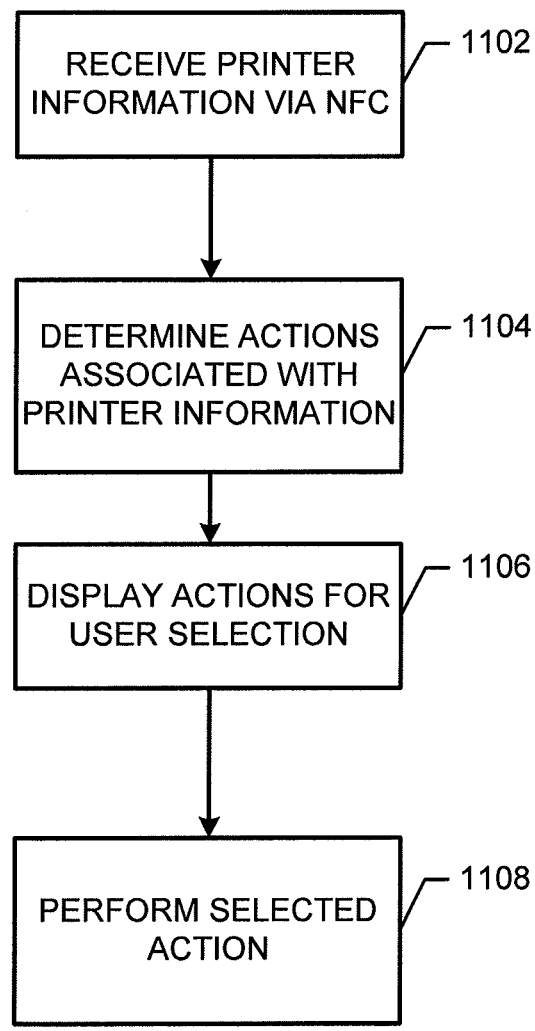
FIG. 11 is a flow diagram for receiving printer NFC information using an NFC-enabled device according to various example embodiments.

In some example embodiments, applications that are implemented on the printer 100 may be updated or purchased via near field communication. Further, the NFC tag may be used to initiate a purchase for the printer, such as the purchase of a Zebra Basic Interpreter (ZBI) key or other authentication keys to unlock functionality of the printer, such as additional fonts. For example, the NFC tag may include an NDEF record that launches an application on the NFC enabled device that allows the NFC enabled device to purchase the additional functionality via a network interface. Additionally, a similar process may be used to purchase warranties or other related products or services. FIG. 11 is a flow diagram for receiving printer NFC information using an NFC enabled device according to various example embodiments. As described above, the NFC enabled device may interact with an NFC tag associated with the printer and take actions based on the data encoded on the NFC tag. The NFC tag may be encoded with one or more NDEF records that enable the NFC enabled device to perform certain tasks. The method 1100 depicts an example of a process for this interaction.

At action 1102, the NFC enabled device receives data from the NFC tag via near field communications. As described above, the NFC tag may be a static tag or a dynamic tag, so the information may be dynamically programmed by the printer (e.g., diagnostic or configuration information) or the data may be static (e.g., data that is unlikely to change, such as a printer serial number).

At action 1104, the mobile terminal may determine one or more actions associated with the received printer information. For example, a set of printer information may enable multiple tasks for execution by the mobile terminal, such as allowing the user to order printer media, performing printer diagnostics, viewing a printer manual, registering for a printer warranty, or enabling a network connection with the printer. Information associated with each of these tasks may be included in NDEF records provided by the NFC tag. In some embodiments, the information may be associated with a single NDEF type that will launch a printer management application on the NFC enabled device, and information for each of the actions may be extracted from the single NDEF type. Additionally or alternatively, the NFC tag may include multiple NDEF types for one or more of the actions. Various example actions that may be performed by the NFC enabled device are described above and below, with respect to FIGS. 1-10 and the additional embodiments enumerated below.

At action 1106, the NFC enabled device may present the various actions to the user for selection. Many NFC enabled devices may not allow NFC data to arbitrarily perform actions, and as such the user may be prompted to determine if they wish to allow the NFC enabled device to perform the action indicated by the data stored in the NFC tag. In some embodiments, the NFC enabled device may present a menu to the user with each option associated with the records of the tag.

At action 1108, the NFC enabled device may perform an action selected by the user. As described above, the NFC enabled device may launch an application or take otherwise appropriate action based on the data received from the NFC tag and in conjunction with the user's selection. Although the present example is provided for allowing a user to select an action, embodiments of the method may also allow for automatic execution of some or all actions in response to receipt of the NFC data.

In some example embodiments, the printer 100 may leverage near field communications to encode media that includes an NFC tag (e.g., labels, smart cards, etc.), possibly while printing the media. In some example embodiments, the encoded media may include an adhesive to permit the media to be affixed to a surface. Use of near field communications and the printer's NFC antenna to encode print media with NFC tags may, according to some example embodiments, be useful with smaller printers that do not have space for a larger coupler device. Additionally, according to some example embodiments, if a printer is intended for relatively light-duty encoding of media, use of the printer's NFC antenna encoding media with NFC tags may be desirable.

Additionally or alternatively, a card that includes an ultra-high frequency (UHF) device and an NFC device may be encoded by the printer 100 to produce cards that provide for long range identification via the UHF device, and short range transaction and access control via the NFC tag. According to some example embodiments, such a dual-mode card may be useful in the hospitality industry and in settings such as casinos, resorts, theme parks, store loyalty, school campuses, and in enterprise badging settings.

In some example embodiments, the printer 100 may be configured to leverage near field communications to encode cards, such as plastic eBusiness cards that include an NFC tag. The NFC tags on the cards may be encoded with an Internet address in the form of, for example, a uniform resource locator (URL), or the cards may be encoded with other custom information.

In some example embodiments, the printer 100 may be configured to print an access card using near field communications. A user may send a set of credentials to the printer 100 via near field communications, such as by tapping the user's smart phone to the printer. The printer 100 may act to verify the credentials and, in response to verifying the credentials as valid, print an ID card for the user. Such a system may be to, for example, print visitor badges when a user is known to be visiting a facility. When the user arrives, the user can verify their identity via transmission of the user credential, and the printer may print a visitor pass in response to verifying the credential. For example, a user may use an NFC enabled device to transmit an NDEF record containing identity information for the user, such as a v-card NDEF record. The printer may receive the identity information and print an appropriate access card for the user. A photo record (e.g., an NDEF photo type record) may also be sent in a similar fashion to print a user photo (e.g., a driver's license picture) on the access card.

In some example embodiments, a card in the form of a driver's license may include an NFC tag that the printer 100 encodes with the driver's license holder's information (e.g., name, address, date of birth, driver's license number, etc.). The encoded driver's license may be used to automatically fill out forms using near field communication to communicate the stored information about the individual. For example, a police officer with an NFC enabled device may use the encoded driver's license to fill out a traffic citation form on the device. The forms may be pre-established for consistency and a matching of the field types may be used to fill the forms. Depending on the circumstances, different forms may be used and a user may select the appropriate form to be filled out using the holder's information that is provided via near field communication.

In some example embodiments, the printer may encode a card with hotel room key information. The encoded room key may contain data pertaining to the customer's stay at the hotel, such as their room number, the duration of their stay, or the like. Such an encoded room key may facilitate the purchase of goods and services on the hotel grounds, eliminating the need for the customer to carry their wallet and/or credit cards.

In some example embodiments, the printer may encode a card with customer loyalty information, such as a grocery store loyalty card number. The encoded card may be used during checkout to transmit customer loyalty data (e.g., an ID number) to an NFC enabled reader at the checkout counter.

In some example embodiments, the printer may generate labels, cards, or other media encoded with NFC tags for use with utility meters, such as electrical, water, or gas meters. These labels may include NFC tags that identify the particular meter to which they are affixed. In some embodiments, the meters may include NFC circuitry for writing meter data to the NFC tag, such that meter readers may receive the usage data directly from the tag.

In some example embodiments, the printer may generate labels, cards, or other media encoded with NFC tags for use with transportation systems. For example, a card may be associated with a particular customer account for transportation funds (e.g., subway metro cards). The labels may be read using near field communications and funds automatically deducted from the customer's account as the customer uses the transit system. For example, turnstiles in entry ways to the transportation system may be equipped with NFC readers for accessing customer data from the NFC tag.

In some example embodiments, the printer 100 may encode information on a label or other media that will be used as a shelf label in a retail store or a poster. With the encoded information stored on the NFC tag of the media, users of NFC enabled devices, such as smart phones, may establish a communications link with the tag. Upon doing so, the tag may transmit information such as product information or a unique identifier that permits the smart phone or other NFC enabled device to retrieve product information from the Internet. Sales and promotion information may be retrieved based on the information provided by the NFC tag. In some embodiments, tags may be encoded with particular NFC data such as product universal product codes (UPCs) or stock keeping units (SKUs). For example, the NFC enabled device may be a shelf label printer. As labels are printed for particular products, the NFC enabled device may identify the SKU or UPC for each product, and encode the SKU or UPC on an NFC tag within the label.

An NFC enabled smart phone or other NFC enabled device may act upon the information retrieved from an NFC shelf tag in a variety of ways. According to some example embodiments, an NFC enabled device may have one or more applications installed that leverage the use of information obtained from a shelf tag. In this regard, responsive to the information, the NFC enabled device may be configured to retrieve a coupon from the Internet, perform a price comparison, retrieve consumer ratings for a product or service, or the like.

In some example embodiments, an application may be implemented on an NFC enabled device to perform validation of the encoded information on an NFC tag. By doing so, the information that has been encoded by a printer may be checked for accuracy to minimize or avoid incorrect information on the NFC tags.

Example embodiments of the invention may include an apparatus for printing media and encoding NFC tags included on the embedded media. The media may include access cards, customer loyalty cards, or hotel room keys. The embedded NFC tags may be encoded with data relating to the media, such as access information, a customer loyalty code, or a hotel room number, respectively. Example embodiments of the invention may also include encoded NFC tags embedded on print media.

Example embodiments may include a method and an apparatus for asset management. The apparatus may include an NFC tag assigned to the apparatus, encoded with apparatus specific information. The apparatus may also be associated with a particular user. When the user begins their shift, they may scan the apparatus on an NFC enabled device to log that they have received the apparatus. A time value may be recorded along with the log entry. A second time value may be logged when the user returns the apparatus. By tracking the log times, the printer can be located and associated with the particular user. The NFC tag may also be encoded with status information for management of the assets.

Example embodiments may also include a method and apparatus for managing a manufacturing process or a shipping process. The apparatus being manufactured or shipped may be associated with an NFC tag. The NFC tag may have an identifier for the particular apparatus, such that the apparatus may be scanned as it proceeds throughout the shipping or manufacturing status. Upon scanning the apparatus, a database may be updated with the status of the apparatus. In some embodiments, the NFC tag may also be programmable to contain the current status of the apparatus, such that the NFC tag is updated with the device status throughout the manufacturing or shipping process.

Example embodiments may also include a method and apparatus for generating access cards. An apparatus may be configured to receive user credentials via from an NFC enabled device near field communications. The user credentials may be used to print an access card for the user of the NFC enabled device. The apparatus may validate the credentials to ensure the user is authorized to access a particular asset or facility. In some embodiments, the NFC enabled device also provides a user image, and the user image is printed on the access card.

The description herein provides example, systems, methods and computer program products in accordance with various example embodiments of the present invention.

Means for implementing the functionality of example embodiments of the invention described herein may include hardware, and/or a computer program products including a computer-readable storage medium having one or more computer program code instructions, program instructions, or executable computer-readable program code instructions store therein. In this regard, program code instructions may be stored on a memory device of an apparatus, such as the memory 210, and executed by a processing circuitry, such as the processor 205. As will be appreciated, any such program code instructions may be loaded onto a computer or other programmable apparatus from a computer-readable storage medium to produce a particular machine, such that the particular machine becomes a means for implementing the functions specified. These program code instructions may also be stored in a computer-readable storage medium that can direct a computer, processing circuitry, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified. The program code instructions may be retrieved from a computer-readable storage medium and loaded into a computer, processing circuitry, processor, or other programmable apparatus to configure the computer, processing circuitry, processor, or other programmable apparatus to execute operational steps to be performed on or by the computer, processing circuitry, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide steps for implementing the functions specified. It will also be understood that the functionality described herein may be implemented by special purpose hardware-based computing systems and/or processors which perform the specified functions or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the description provided herein. In this regard, for example, different combinations of elements and/or functions other than those explicitly described above are also contemplated. Although specific terms are employed herein, they are used in a generic and descriptive sense only and not for purposes of limitation.

What is claimed is:

1. A method comprising:
    generating a near field communication (NFC) field using an NFC enabled device;
    receiving, from an NFC tag associated with a printer, a set of data associated with the printer in response to the generated NFC field, wherein the set of data comprises information indicating data stored in at least one sector of the NFC tag; and
    determining a source for information related to the printer based on the data stored in the at least one sector and based on whether the data stored in the at least one sector has changed from a default value, wherein the source for information is either the NFC tag or a remote database, and wherein the source is determined to be the NFC tag in response to determining that the data stored in the at least one sector has not changed from the default value.

2. The method of claim 1, further comprising obtaining the information related to the printer from the determined source.

3. The method of claim 1, wherein the source is determined to be the remote database in response to determining that the data stored in the at least one sector has changed from the default value.

4. The method of claim 3, wherein the data stored in the at least one sector further comprises an address of the remote database.

5. The method of claim 1, wherein the data stored in the at least one sector comprises a read-only status of one or more of the sectors of the NFC tag.

6. The method of claim 5, wherein the data comprising the read-only status comprises a read-only flag.

7. An apparatus comprising:
    an antenna configured to communicate with a near field communication (NFC) tag associated with a device by generating an NFC field; and
    a processor configured to:
        receive a set of data from the NFC tag;
        determine whether the set of data received from the NFC tag has changed from a default value;
        determine, based on whether the set of data has changed from the default value, a data source for data related to the device, wherein the data source is either the NFC tag or a remote database, wherein the data source is determined to be the NFC tag in response to determining that the set of data has not changed from the default value; and
        obtain the data related to the device from the determined data source.

8. The apparatus of claim 7, wherein the set of data comprises a read-only status of at least a portion of the NFC tag.

9. The apparatus of claim 8, wherein the data source is determined to be the remote database in response to the portion of the NFC tag having a read-only status.

10. The apparatus of any of claim 7, wherein the set of data indicates a network address of the remote database, and wherein the network address is used to obtain the data from the determined data source when the remote database is determined to be the data source.

11. The apparatus of claim 7, wherein the apparatus is a mobile phone.

12. The apparatus of claim 7, wherein the set of data further comprises an address of the remote database.

13. The apparatus of claim 7, wherein the set of data is associated with a portion of the NFC tag that has a default status of writable.

14. A computer program product comprising at least one non-transitory computer-readable storage medium having computer-readable program instructions configured to cause an apparatus to:
   generate a near field communication (NFC) field using an NFC enabled device;
   receive, from an NFC tag associated with a printer, a set of data associated with the printer in response to the generated NFC field, wherein the set of data comprises information indicating data stored in at least one sector of the NFC tag; and
   determine a source for information related to the printer based on the data stored in the at least one sector and based on whether the data stored in the at least one sector has changed from a default value, wherein the source for information is either the NFC tag or a remote database, and wherein the source is determined to be the NFC tag in response to determining that the data stored in the at least one sector has not changed from the default value.

15. The computer program product of claim 14, further comprising instructions configured to cause the apparatus to obtain the information related to the printer from the determined source.

16. The computer program product of claim 14, wherein the source is determined to be the remote database in response to determining that the data stored in the at least one sector has changed from the default value.

17. The computer program product of claim 16, wherein the data stored in the at least one sector further comprises an address of the remote database.

18. The computer program product of claim 14, wherein the data stored in the at least one sector comprises a read-only status of one or more of the sectors of the NFC tag.

19. A method comprising:
   generating a near field communication (NFC) field using an NFC enabled device;
   receiving, from an NFC tag associated with a printer, a set of data associated with the printer in response to the generated NFC field, wherein the set of data comprises information indicating data stored in at least one sector of the NFC tag; and
   determining a source for information related to the printer based on the data stored in the at least one sector and based on whether the data stored in the at least one sector has changed from a default value, wherein the source for information is either the NFC tag or a remote database, wherein the source is determined to be the remote database in response to determining that the data stored in the at least one sector has changed from the default value.

20. A computer program product comprising at least one non-transitory computer-readable storage medium having computer-readable program instructions configured to cause an apparatus to:
   generate a near field communication (NFC) field using an NFC enabled device;
   receive, from an NFC tag associated with a printer, a set of data associated with the printer in response to the generated NFC field, wherein the set of data comprises information indicating data stored in at least one sector of the NFC tag; and
   determine a source for information related to the printer based on the data stored in the at least one sector and based on whether the data stored in the at least one sector has changed from a default value, wherein the source for information is either the NFC tag or a remote database, wherein the source is determined to be the remote database in response to determining that the data stored in the at least one sector has changed from the default value.

21. An apparatus comprising:
   an antenna configured to communicate with a near field communication (NFC) tag associated with a device by generating an NFC field; and
   a processor configured to:
      receive a set of data from the NFC tag;
      determine whether the set of data received from the NFC tag has changed from a default value;
      determine, based on whether the set of data has changed from the default value, a data source for data related to the device, wherein the data source is either the NFC tag or a remote database, wherein the data source is determined to be the remote database in response to determining that the set of data has changed from the default value; and
      obtain the data related to the device from the determined data source.

* * * * *